(12) United States Patent
Yoshikawa et al.

(10) Patent No.: US 7,917,707 B2
(45) Date of Patent: Mar. 29, 2011

(54) SEMICONDUCTOR DEVICE

(75) Inventors: Takashi Yoshikawa, Kawasaki (JP);
Yutaka Yamada, Yokohama (JP);
Shigehiro Asano, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 12/052,324

(22) Filed: Mar. 20, 2008

(65) Prior Publication Data

US 2009/0037674 A1    Feb. 5, 2009

(30) Foreign Application Priority Data

Jul. 31, 2007    (JP) ................................ P2007-198816

(51) Int. Cl.
*G06F 12/00* (2006.01)
(52) U.S. Cl. .......................... 711/154; 711/156; 711/220
(58) Field of Classification Search .................... None
See application file for complete search history.

(56) References Cited

U.S. PATENT DOCUMENTS

| 2004/0060050 | A1* | 3/2004 | Bieringer | ...................... 718/102 |
| 2004/0103264 | A1 | 5/2004 | Fujii et al. | |
| 2007/0245131 | A1 | 10/2007 | Yoshikawa et al. | |

FOREIGN PATENT DOCUMENTS

JP    2006-85574    3/2006

* cited by examiner

*Primary Examiner* — Reginald G Bragdon
*Assistant Examiner* — Baboucarr Faal
(74) *Attorney, Agent, or Firm* — Oblon, Spivak, McClelland, Maier & Neustadt, L.L.P.

(57) ABSTRACT

A semiconductor device includes a plurality of operating units, a controller that controls the plurality of operating units according to predetermined state transition, a first storage that stores data to be processed, a second storage that stores circuit information specifying an operation process performed in the plurality of operating units, a third storage that stores data access information for the first storage and a pointer for the second storage in association with a state of the controller. The controller reads an address and the pointer stored in the third storage according to the state, and transmits the circuit information stored in a region of the second storage specified by the read pointer to the plurality of operating units.

9 Claims, 11 Drawing Sheets

FIG. 8

| OPERATING UNIT CODE TAG | STORAGE THAT STORES CIRCUIT INFORMATION |
|---|---|
| | CIRCUIT INFORMATION LATCH 101A TO 101D OF OPERATING UNIT 10E |
| | CIRCUIT INFORMATION LATCH 101E TO 101H OF OPERATING UNIT 10E |
| | CIRCUIT INFORMATION LATCH 101A TO 101D OF OPERATING UNIT 10D |
| | CIRCUIT INFORMATION LATCH 101E TO 101H OF OPERATING UNIT 10D |
| | CIRCUIT INFORMATION LATCH 101A TO 101D OF OPERATING UNIT 10C |
| | CIRCUIT INFORMATION LATCH 101E TO 101H OF OPERATING UNIT 10C |
| | CIRCUIT INFORMATION LATCH 101A TO 101D OF OPERATING UNIT 10B |
| | CIRCUIT INFORMATION LATCH 101E TO 101H OF OPERATING UNIT 10B |
| | CIRCUIT INFORMATION LATCH 101A TO 101D OF OPERATING UNIT 10A |
| | CIRCUIT INFORMATION LATCH 101E TO 101H OF OPERATING UNIT 10A |
| OTHER | NOT STORED IN STORAGES OF OPERATING UNITS 10 |

| | REPETITION RANGE | REPETITION NUMBER |
|---|---|---|
| ADDRESS 0 | 2 | 1 |
| ADDRESS 1 | 2 | 2 |
| ADDRESS 2 | 0 | 0 |

CODE TRANSMISSION REQUEST INFORMATION — START ADDRESS OF PROGRAM CODE — START ADDRESS OF DATA PATH CIRCUIT INFORMATION — START ADDRESS OF OPERATING CIRCUIT INFORMATION — SIZE OF PROGRAM CODE — SIZE OF DATA PATH CIRCUIT INFORMATION — SIZE OF OPERATING CIRCUIT INFORMATION

00 | 1 | 10 | 2 | 20 | 5

SEMICONDUCTOR DEVICE

RELATED APPLICATION(S)

The present disclosure relates to the subject matters contained in Japanese Patent Application No. 2007-198816 filed on Jul. 31, 2007, which is incorporated herein by reference in its entirety.

FIELD

The present invention relates to a semiconductor device.

BACKGROUND

In recent years, with sophistication and diversification of functions of devices such as portable devices requiring reduced costs and low power consumption, these devices are required to have high processing speed. Manufacture and development of dedicated hardware are inevitable in order to obtain high processing speed compatible with low power consumption. However, with such functional sophistication and diversification, costs for manufacture and development of the dedicated hardware have increased every year.

For reduction of manufacture and development costs, semiconductor devices using a dynamically reconfigurable circuit technique have attained attention. An example of such semiconductor devices is disclosed in the following document, which will simply referred to as Sueyoshi:

Toshinori SUEYOSHI et al, "Reconfigurable System" Ohmsha, Ltd. Aug. 25, 2005, pp 189-208

The semiconductor device disclosed in Sueyoshi includes a two-dimensional array of processing elements (PEs) as basic elements for performing an operation process and a controller disposed in the middle of the PEs. Each of the PEs is an operating device which is capable of dynamically modifying a PE circuit configuration. Circuit information defining the kind of operation performed in each PE and a connection relationship between PEs is stored in an instruction memory contained in the semiconductor device. The PEs have their circuit configuration dynamically modified based on the circuit information stored in the instruction memory, exchange data therebetween, and perform the operation process.

It is preferable that such a semiconductor device has high processing performance even in low storage capacity of the instruction memory. However, the semiconductor device using a dynamically reconfigurable circuit technique as disclosed in Sueyoshi has a trade-off relationship between the storage capacity of the instruction memory and its processing performance.

For example, when the operation process performed in the PEs is changed and the circuit configuration of the PEs is dynamically modified, if the instruction memory has a storage capacity high sufficient to store any circuit information which is currently being used or used later, the PEs can perform the operation process based on the circuit information stored in the instruction memory without newly writing circuit information into the instruction memory. Then, the PEs may have higher processing performance since time taken to change the operation process becomes shorter.

On the other hand, if the instruction memory has a storage capacity so low as to store only the circuit information before change of the operation process performed in the PEs, it is necessary to write the circuit information after change of the operation process into the instruction memory. On this account, while the circuit information after the change is being written into the instruction memory, the PEs cannot perform the operation process, which results in deterioration of its processing performance.

SUMMARY

According to a first aspect of the invention, there is provided a semiconductor device including: a first storage that stores a program code including unit codes defining a state transition; a second storage that stores base address information in association with the unit codes; a third storage that stores data; a fourth storage that stores circuit information that specifies operation process; a controller that operates to: sequentially read the program code stored in the first storage for each unit code; read and output the data stored in the third storage; read and output the circuit information stored in the fourth storage; and transition a state by executing the read program code for each unit code; a first operating unit that performs a first operation process that is specified by the circuit information received from the controller for data received from the controller; a second operating unit that performs a second operation process that is specified by the circuit information received from the controller for a result of the first operation process performed by the first operating unit; and a fifth storage that stores offset information for generating an address specifying the data read from the third storage and a pointer specifying the circuit information stored in the fourth storage in association with each state to be transitioned by the controller, wherein the controller further operates to: read the base address information associated with the unit code being executed from the second storage; read the offset information and the pointer associated with a current state from the fifth storage; calculate an address by operating the read base address information and the read offset information; transmit the data stored in the third storage and specified by the calculated address to the first operating unit; and transmit the circuit information stored in the fourth storage and specified by the read pointer to the first and second operating units.

According to a second aspect of the invention, there is provided a semiconductor device including: a first storage that stores a program code including unit codes defining a state transition; a second storage that stores first base address information in association with the unit codes; a controller that sequentially reads the program code stored in the first storage for each unit code and transitions a state by executing the read unit code; a first operating unit that is provided with a third storage that stores a first circuit information and performs a first operation process that is specified by the first circuit information for data received from the controller; a second operating unit that is provided with a fourth storage that stores a second circuit information and performs a second operation process specified by the second circuit information for a result of the first operation process performed by the first operating unit; a fifth storage that stores the data; and a sixth storage that stores first offset information for generating an address specifying the data read from the fifth storage and a pointer specifying the first circuit information and the second circuit information in association with each state to be transitioned by the controller, wherein the controller operates to: read the first base address information associated with the unit code being executed from the second storage; read the first offset information and the pointer associated with a current state from the sixth storage; calculate a first address by operating the read first base address information and the read first offset information; and transmit the data stored in the fifth storage and specified by the calculated first address and the read pointer to the first operating unit, wherein the first operating unit reads the first circuit information stored in the third storage and specified by the pointer, and performs the first operation process that is specified by the first circuit information for the data, and wherein the second operating unit reads the second circuit information stored in the fourth storage and specified by the pointer received from the first operating unit, and performs the second operation process that is specified by the second circuit information for the result of the first operation process performed by the first operating unit.

According to a third aspect of the invention, there is provided a semiconductor device including: a first storage that stores a program code including unit codes defining a state transition; a controller that sequentially reads the program code stored in the first storage for each unit code and transitions a state by executing the read unit code; a plurality of operating units that perform an operation process that is specified by circuit information for each cycle; a second storage that stores a first circuit information that specifies an operation process performed by a first one of the plurality of operating units; and a third storage that stores a pointer specifying the first circuit information stored in the second storage and a second circuit information that specifies an operation process performed by a second one of the plurality of operating units in association with each state to be transitioned by the controller, wherein the controller operates for each cycle to: read the second circuit information and the pointer associated with a current state from the third storage; transmit the second circuit information to the second one of the plurality of operating units; and transmit the first circuit information stored in the second storage and specified by the pointer to the first one of the plurality of operating units.

According to a fourth aspect of the invention, there is provided a semiconductor device including: a first storage that stores a program code including unit codes defining a state transition; a controller that sequentially reads the program code stored in the first storage for each unit code and transitions a state by executing the read unit code; a first operating unit provided with a second storage that stores a first circuit information and performs a first operation process that is specified by the first circuit information; a second operating unit provided with a third storage that stores a second circuit information and performs a second operation process that is specified by the second circuit information; and a fourth storage that stores a pointer specifying the first circuit information stored in the second storage and the second circuit information stored in the third storage in association with each state to be transitioned by the controller, wherein the controller reads the pointer associated with a current state from the fourth storage, and transmits the pointer to the first operating unit for each cycle, wherein the first operating unit operates for each cycle to: read the first circuit information stored in the second storage and specified by the pointer; perform the first operation process that is specified by the first circuit information; and transmit the pointer to the second operating unit, and wherein the second operating unit reads the second circuit information stored in the third storage and specified by the pointer received from the first operating unit, and performs the second operation process that is specified by the second circuit information for each cycle.

According to a fifth aspect of the invention, there is provided a semiconductor device including: a first storage that stores a program code including unit codes defining a state transition; a controller that sequentially reads the program code stored in the first storage for each unit code and transitions a state by executing the read unit code; a first operating unit that performs a first operation process specified by a first circuit information for each cycle; a second operating unit provided with a second storage that stores a second circuit information and performs a second operation process that is specified by the second circuit information; and a third storage that stores the first circuit information and a pointer specifying the second circuit information stored in the second storage in association with each state to be transitioned by the controller, wherein the controller operates for each cycle to: read the first circuit information and the pointer associated with a current state from the third storage; transmit the first circuit information to the first operating unit; and transmit the pointer to the second operating unit, wherein the first operating unit performs the first operation process specified by the first circuit information for each cycle, and wherein the second operating unit reads the second circuit information stored in the second storage and specified by the pointer, and performs the second operation process that is specified by the second circuit information.

BRIEF DESCRIPTION OF THE DRAWINGS

In the accompanying drawings:

FIG. 8 is a view showing a relationship between an operating unit code tag and a storage in which operating unit circuit information is stored;

DETAILED DESCRIPTION OF THE EMBODIMENTS

An embodiment of the present invention will be explained with reference to the accompanying drawings.

Figure 1:
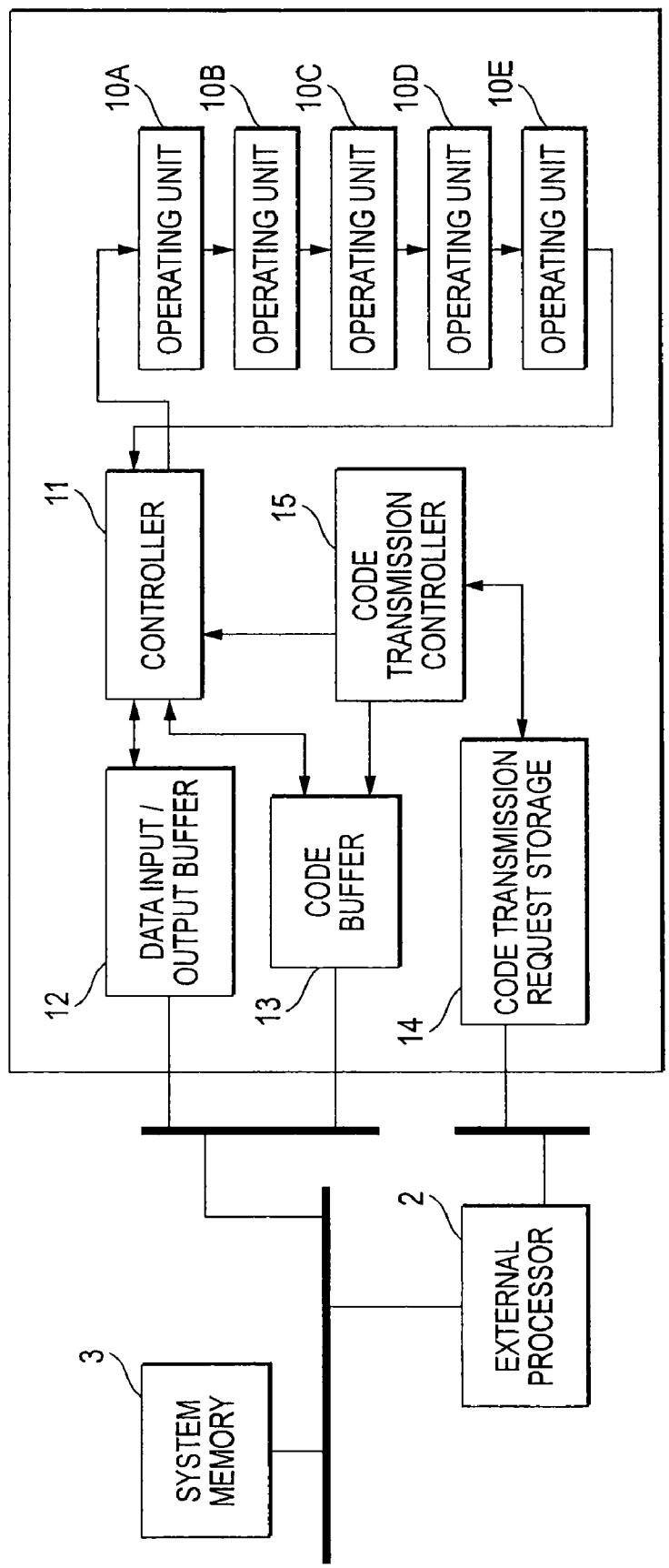
FIG. 1 is a block diagram showing a configuration of a semiconductor device according to an embodiment of the present invention.

FIG. 1 is a block diagram showing a configuration of a semiconductor device 1 according to an embodiment of the present invention.

The semiconductor device 1 according to the embodiment includes operating units 10A to 10E, a controller 11, a data input/output buffer 12, a code buffer 13, a code transmission request storage 14, and a code transmission controller 15.

The controller 11 is connected to the data input/output buffer 12, the code buffer 13, and the code transmission controller 15. The code transmission controller 15 is connected to the controller 11, the code buffer 13 and the code transmission request storage 14. The operating unit 10A is connected to the controller 11 and the operating unit 10B. The operating unit 10B is connected to the operating unit 10A and the operating unit 10C. The operating unit 10C is connected to the operating unit 10B and the operating unit 10D. The operating unit 10D is connected to the operating unit 10C and the operating unit 10E. The operating unit 10E is connected to the operating unit 10D and the controller 11.

An external processor 2 accesses a system memory 3 and operates according to a program stored in the system memory 3. The external processor 2 transmits data and program codes to the semiconductor device 1 to instruct the semiconductor device 1 to process the data and program codes. The external processor 2 makes direct access to the data input/output buffer 12, the code buffer 13 and the code transmission request storage 14.

The operating units 10A to 10E receive circuit information specifying a circuit configuration of an operator. The operating unit 10A to 10E store various circuit information.

The operating units 10A to 10E receive data to be processed and a circuit information pointer to determine based on which stored circuit information should be used to perform an operation process. The operating units 10A to 10E perform the operation process for the received data based on the circuit information specified by the received circuit information pointer. The operating units 10A to 10E transmit data and a circuit information pointer as an operation result.

In the operating units 10A to 10E, the data and the circuit information pointer propagate one time at one cycle between the operating units over 5 cycles from the operating unit 10A to the operating unit 10E. For example, the data and the circuit information pointer transmitted from the controller 11 to the operating unit 10A at any cycle are transmitted from the operating unit 10A to the operating unit 10B at the next cycle. The data and the circuit information pointer transmitted from the operating unit 10A to the operating unit 10B are again transmitted from the operating unit 10B to the operating unit 10C at a cycle following the next cycle.

Similarly, the data and the circuit information pointer propagate from the operating unit 10C to the operating unit 10E for operation process in the respective operating units. When the operating unit 10E transmits the data to the controller 11, data process by the operating units 10A to 10E are ended.

Here, a cycle refers to a minimum time unit taken from a change of a value of a storage element to a next change of the value of the storage element in a synchronous circuit.

The data input/output buffer 12 temporarily stores the data used for operation by the operating units 10A to 10E and a result of operation. Before the operation process by the operating units 10A to 10E starts, the data are written into the data input/output buffer 12 by the external processor 2. The operating units 10A to 10E perform the operation process using the data. The result of operation is written into the data input/output buffer 12. The result of operation written into the data input/output buffer 12 is read out by the external processor 2.

The code buffer 13 stores a program code that specifies operation of the controller 11, data path circuit information that reads data on the data input/output buffer 12 and specifies position of data write, and operating unit circuit information used for the operation process of the operating units 10A to 10E. Before the operation process by the operating units 10A to 10E starts, the program code, the data path circuit information and the operating unit circuit information are written into the code buffer 13 by the external processor 2.

The controller 11 transmits a circuit information pointer to the operating unit 10A to 10E and controls the operation process based on the program code transmitted from the code buffer 13. The controller 11 controls data access to the data input/output buffer 12 based on the data path circuit information stored in the code buffer 13.

The code transmission request storage 14 stores code transmission request information to specify which of the program code, the data path circuit information and the operating unit circuit information stored in the code buffer 13 is to be transmitted to the controller 11 or the operating units 10A to 10E.

The code transmission request information is stored in order in the code transmission request storage 14 by the external processor 2. The code transmission request storage 14 is FIFO (First in First Out). The code transmission request storage 14 transmits the code transmission request information to the code transmission controller 15. After a transmission of the code transmission request information, the area storing the information becomes available, and the external processor 2 can write new code transmission request in the area.

When the code transmission request storage 14 has no capacity to store the code transmission request information, the code transmission request storage 14 informs the external processor 2 that the unit 14 cannot receive the code transmission request information.

The code transmission controller 15 transmits the program code, the data path circuit information and the operating unit circuit information stored in the code buffer 13 to the controller 11 based on the code transmission request information received from the code transmission request storage 14. In addition, the operating unit circuit information is transmitted to the operating units 10A to 10E via the controller 11.

After completion of transmission of all of the program code, the data path circuit information and the operating unit circuit information specified to the code transmission request information read from the code transmission request storage 14, the code transmission controller 15 transmits data process start notification to start the operation process to the controller 11 and transmits code transmission request completion notification for transmission of new code transmission request information to the code transmission request storage 14.

Next, an outline of process of the semiconductor device 1 according to the embodiment will be described. The process of the semiconductor device may be divided into an initialization process up to when the program code and the data path circuit information are stored in the controller 11 and the operating unit circuit information is stored in the operating units 10A to 10E, and a data process in which the controller 11 causes the operating units 10A to 10E to perform the operation process based on the program code, which will be described in detail below. The initialization process and the data process are simultaneously performed in the semiconductor device 1.

Initialization Process

First, the external processor 2 writes data into the data input/output buffer 12 and writes the program code and the circuit information into the code buffer 13.

Next, the external processor 2 writes the code transmission request information into the code transmission request storage 14. The code transmission request information includes address information indicating a position in the code buffer 13 at which the program code, the data path circuit information and the operating unit circuit information are stored, and size information indicating size of the program code, the data path circuit information and the operating unit circuit information.

Next, the code transmission controller 15 reads out the oldest code transmission request information stored in the code transmission request storage 14.

Next, the code transmission controller 15 transmits the program code, the data path circuit information and the operating unit circuit information from the code buffer 13 to the controller 11 according to the read code transmission request information. In addition, the operating unit circuit information is received in the operating units 10A to 10E via the controller 11.

After completion of transmission of the program code, the data path circuit information and the operating unit circuit information, the code transmission controller 15 transmits the data process start notification to start the data process to the controller 11. Upon receiving the data process start notification, the controller 11 starts the data process. In addition, the code transmission controller 15 transmits the code transmission request completion notification for transmission of new code transmission request information to the code transmission request storage 14.

Thereafter, the code transmission controller 15 transmits the program code, the data path circuit information and the operating unit circuit information from the code buffer 13 to the controller 11 according to the next oldest code transmission request information stored in the code transmission request storage 14.

Next, after completion of transmission of the program code, the data path circuit information and the operating unit circuit information required for the data process, the code transmission controller 15 transmits the next data process start notification to the controller 11. Upon receiving the next data process start notification, the controller 11 performs the next data process.

The code transmission controller 15 determines, for each cycle, which of the program code, the data path circuit information and the operating unit circuit information stored in the code buffer 13 is to be transmitted to the controller 11, depending on a data process progress state received from the controller 11. The code transmission controller 15 transmits a result of the determination to the controller 11.

Data Process

Hitherto, the initialization process has been described. Next, the data process performed by the controller 11 after receiving the data process start notification will be described.

First, upon receiving the data process start notification from the code transmission controller 15, the controller 11 executes, for each cycle, the program code transmitted from the code transmission controller 15.

That is, the controller 11 reads data out of the data input/output buffer 12 and writes data into the data input/output buffer 12. In addition, the controller 11 transmits, to the operating unit 10A, the data read out of the data input/output buffer 12 and the circuit information pointer transmitted from the code buffer 13. In addition, the controller 11 writes an operation result received from the operating unit 10E into the data input/output buffer 12. Again, the controller 11 informs the code transmission controller 15 of a data process progress state.

Next, the operating unit 10A receives the data and the circuit information pointer from the controller 11 and performs the operation process.

That is, the operating unit 10A reads the circuit information specified by the received circuit information pointer out of a storage and modifies a configuration of an operator contained in the operating unit 10A according to the read circuit information. In addition, the operating unit 10A performs the operation process by means of the operator with the received data as an input. After completing the operation process, the operating unit 10A transmits an operation result and the circuit information pointer to the operating unit 10B. In addition, the circuit information pointer transmitted from the operating unit 10A to the operating unit 10B is identical with the circuit information pointer received in the operating unit 10A from the controller 11. Thereafter, the identical circuit information pointer is in turn transmitted to the operating units 10B to 10E.

Next, the operating unit 10B receives the data and the circuit information pointer from the operating unit 10A and performs the operation process in the same way as the operating unit 10A. Upon completing the operation process, the operating unit 10B transmits an operation result and the circuit information pointer to the operating unit 10C.

In addition, the operating units 10C to 10E also perform the operation process in the same way as the operating unit 10A. An operation result of the operating unit 10E is transmitted to the controller 11.

As described above, the controller 11 performs the data process for each cycle.

Since the data process from the operating unit 10A up to the operating unit 10E requires the total of 5 cycles, 5 data processes are performed in parallel as a pipeline.

Next, at the point of time when all the program codes are executed, the controller 11 informs the external processor 2 of the completion of the data process and then ends the data process. After a predetermined cycle elapses after the external processor 2 is informed of the completion of the data process, the external processor 2 reads a data process result stored in the data input/output buffer 12. Here, the predetermined cycle refers to an addition of the number of operating units and the number of cycles required for write of data into the data input/output buffer 12.

Hitherto, the data process has been described. Next, the internal configuration of the semiconductor device 1 according to the embodiment will be described in detail.

Figure 2:
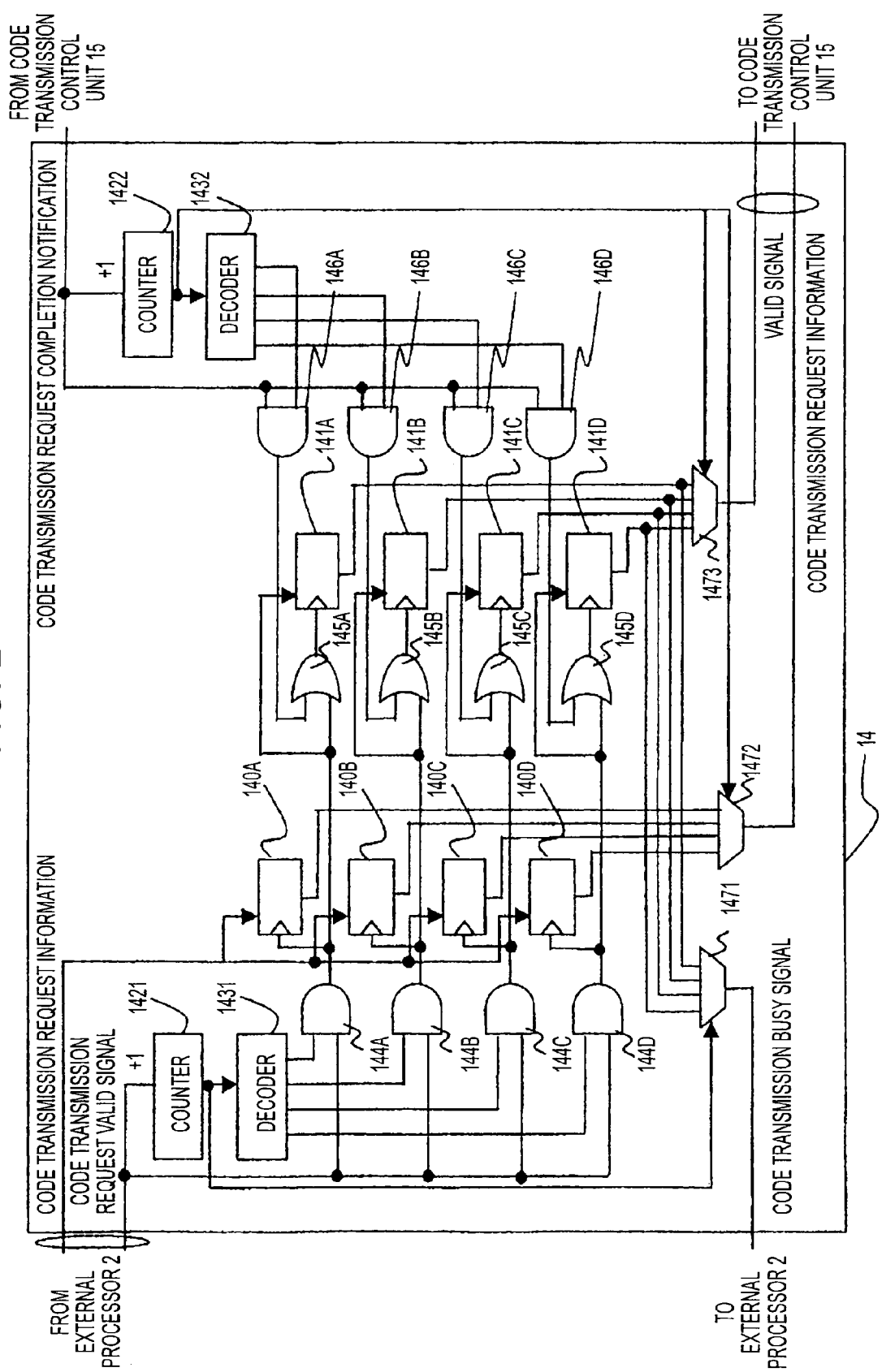
FIG. 2 is a block diagram showing a configuration of a code transmission request storage according to the embodiment.

FIG. 2 is a block diagram showing a configuration of the code transmission request storage 14.

The code transmission request storage 14 includes code transmission request latches 140A to 140D, valid latches 141A to 141D, counters 1421 and 1422, decoders 1431 and 1432, AND logic units 144A to 144D and 146A to 146D, OR logic units 145A to 145D, and selectors 1471 to 1473.

The code transmission request storage 14 is input with code transmission request information and a code transmission request valid signal from the external processor 2 and is also input with code transmission request completion notification from the code transmission controller 15.

First, a process of the code transmission request storage 14 when the code transmission request information and the code transmission request valid signal are input from the external processor 2 will be described.

The code transmission request information is information that indicates addresses and sizes of the program code, the data path circuit information and the operating unit circuit information on the code buffer 13. The code transmission request valid signal is a signal that becomes "1" when the code transmission request information is written from the external processor 2 into the code transmission request storage 14 and becomes "0" otherwise.

The counter 1421 is input with the code transmission request valid signal from the external processor 2. The counter 1421, which is a saturated counter whose value is incremented by "+1" whenever the code transmission request valid signal is input, has the maximum value of "3." On this account, an output of the counter 1421 is changed to "0", "1", "2", "3", "0", "1", . . . etc. The number of kinds of value taken by the output of the counter 1421 is the total of 4 and is equal to the maximum number of code transmission request information which can be stored in FIFO, that is, the number of code transmission request latches 140A to 140D. In addition, an initial value of the counter 1421 is set to be equal to an initial value of the counter 1422.

The decoder 1431 is input with a value of the counter 1421, and assumes one of its four outputs as "1" and the remaining as "0" for the value of the counter 1421.

The AND logic units 144A to 144D perform their respective AND operation with the output of the decoder 1431 as their respective one inputs and with the code transmission request valid signal input from the external processor 2 as their respective other inputs. Outputs of the AND logic units 144A to 144D are respectively input to triggers of the code transmission request latches 140A to 140D and to inputs and triggers of the valid latches 141A to 141D. For example, if an output of the AND logic 144A is "1," the code transmission request information input from the external processor 2 is stored in the code transmission request latch 140A, and "1" is stored in the valid latch 141A.

The selector 1471 selects one of outputs of the valid latches 141A to 141D based on a value of the counter 1421 and transmits the selected output, as a code transmission busy signal, to the external processor 2. That is, the selector 1471 selects one of the outputs of the valid latches 141A to 141D corresponding to the code transmission request latches 140A to 140D into which the code transmission request information is to be written next, and transmits the selected output to the external processor 2.

A value "1" of the valid latches 141A to 141D indicates that valid code transmission request information is stored in the corresponding code transmission request latches 140A to 140D. On this account, if the code transmission busy signal is "1," the external processor 2 cannot write the code transmission request information into the code transmission request storage 14.

Next, a process of the code transmission request storage 14 when the code transmission request completion notification is input from the code transmission controller 15 will be described.

The code transmission request completion notification is a signal that becomes "1" when the process of transmitting the program code and the circuit information from the code buffer 13 to the controller 11 according to the code transmission request information read by the code transmission controller 15 out of the code transmission request storage 14 is completed, and becomes "0" otherwise.

The counter 1422 is input with the code transmission request completion notification from the code transmission controller 15. The counter 1422 is a saturated counter whose value is incremented by "+1" whenever the code transmission request completion notification is input. Like the counter 1431, a value of the counter 1422 is changed to "0", "1", "2", "3", "0", "1", . . . etc.

The decoder 1432 assumes one of its four outputs as "1" and the remaining as "0" according to the value of the counter 1422. A decode rule defining an input/output relationship between the decoder 1432 and the decoder 1431 is set in the same way as the above.

The AND logic units 146A to 146D perform their respective AND operation with the output of the decoder 1432 as their respective one inputs and with the code transmission request completion notification input from the code transmission controller 15 as their respective other inputs. Outputs of the AND logic units 146A to 146D are respectively input to triggers of the valid latches 141A to 141D.

Here, the outputs of the AND logic units 144A to 144D, that is, the inputs of the valid latches 141A to 141D, are "0."

On this account, if one of the outputs of the AND logic units 146A to 146D becomes "1" and the output "1" is input in one of the triggers of the valid latches 141A to 141D, a value of the valid latch becomes "0." For example, when an output of the AND logic 146A becomes "1," a value of the valid latch 141A becomes "0." This allows write of new code transmission request information into the code transmission request latch 140A corresponding to the valid latch 141A.

The selector 1472 selects one of outputs of the code transmission request latches 140A to 140D based on a value of the counter 1422 and transmits the selected output to the code transmission controller 15. That is, when the code transmission request completion notification becomes "1," the selector 1472 selects one of the outputs of the code transmission request latches into which code transmission request to be processed next is stored, and transmits the selected output to the code transmission controller 15.

The selector 1473 selects one of outputs of the valid latches 141A to 141D based on a value of the counter 1422 and transmits the selected output to the code transmission controller 15. That is, the selector 1473 selects one of the outputs of the valid latches corresponding to a code transmission request latch selected by the selector 1472, and transmits the selected output to the code transmission controller 15. In addition, an output of the selector 1473, as a valid signal, is used to confirm that the code transmission request information is valid.

Figure 3:
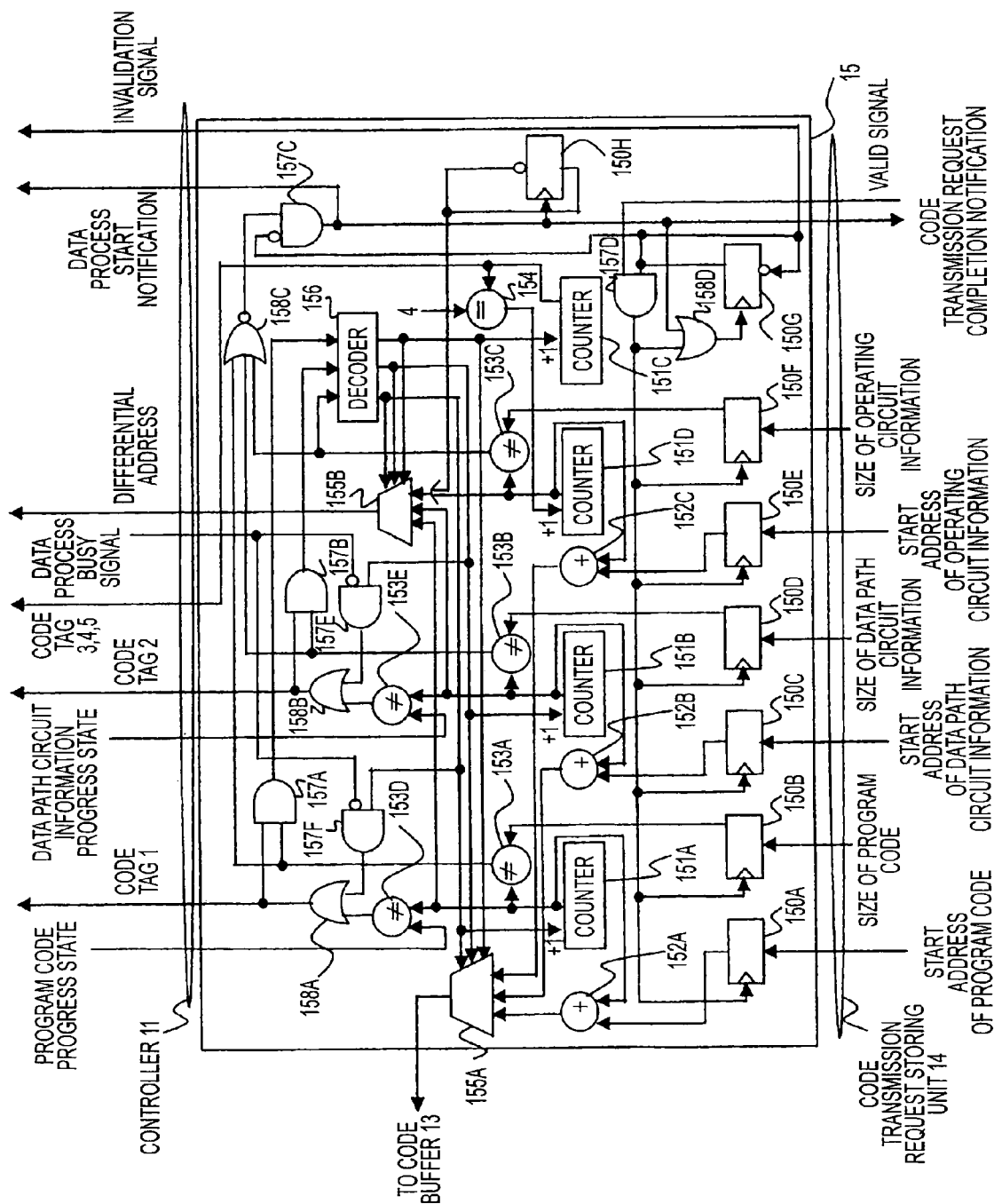
FIG. 3 is a block diagram showing a configuration of a code transmission controller according to the embodiment.

FIG. 3 is a block diagram showing a configuration of the code transmission controller 15.

The code transmission controller 15 includes latches 150A to 150H, counters 151A to 151D, adders 152A to 152C, comparator 153A to 153E and 154, selectors 155A and 155B, a decoder 156, AND logic units 157A to 157F, and OR logic units 158A to 158D.

The code transmission controller 15 is input with the code transmission request information and the valid signal from the code transmission request storage 14. The code transmission request information includes a start address and a size of the program code, a start address and a size of the data path circuit information, and a start address and a size of the operating unit circuit information in the code buffer 13.

The program code specifies an operation of the controller 11 in data process. The data path circuit information specifies data access of the controller 11 to the data input/output buffer 12 in the data process. The operating unit circuit information specifies a circuit configuration of operators of the operating units 10A to 10E.

When the code transmission controller 15 is input with the code transmission request information and a valid signal "1" from the code transmission request storage 14 at a cycle at which a value of the latch 150G is "1," the code transmission controller 15 stores the code transmission request information in the latches 150A to 150G.

The latch 150A stores a start address of the program code and the latch 150B stores a size of the program code. The latch 150C stores a start address of the data path circuit information and the latch 150D stores a size of the data path circuit information. The latch 150E stores a start address of the operating unit circuit information and the latch 150F stores a size of the operating unit circuit information.

In addition, the latch 150G controls write of the code transmission request information into the latches 150A to 150F by the code transmission controller 15. If a value of the latch 150G is "1," the valid code transmission request information transmitted from the code transmission request storage 14 is written into the latches 150A to 150F, and the value of the latch 150G is updated to "0." On the other hand, if a value of the latch 150G is "0," the code transmission request information stored in the latches 150A to 150F is not updated even when the valid code transmission request information is received from the code transmission request storage 14. According to the code transmission request information stored in the latches 150A to 150F, the value of the latch 150G is returned to "1" at a point of time when all of the program code, the data path circuit information and the operating unit circuit information are transmitted to the controller 11.

In addition, if the valid signal transmitted along with the code transmission request information from the code transmission request storage 14 is "1," it indicates that the code transmission request information is valid. If the valid signal is "0," it indicates that the code transmission request information is invalid. On this account, if the valid signal is "0," the code transmission controller 15 does not store the code transmission request information, which is input from the code transmission request storage 14, in the latches 150A to 150G.

When the code transmission request information is stored in the latches 150A to 150G, a values of the latch 150G is set to "0" and values of the counters 151A to 151D are initialized to "0." Here, the values of the counters 151A to 151D are used as differential values of address.

As an example, an operation of the code transmission controller 15 when the code transmission controller 15 transmits the program code from the code buffer 13 to the controller 11 will be described.

The latch 150A stores the start address of the program code. The adder 152A adds the start address of the program code and a value of the counter 151A. Here, since the value of the counter 151A is initialized to "0," an output of the adder 152A is equal to the start address of the program code. That is, one of three inputs of the selector 155A is the start address of the program code. Likely, the remaining two inputs of the selectors 155A become the start address of the path circuit information and the start address of the operating unit circuit information, respectively.

The selector 155A selects and outputs one of the three inputs according to an output of the decoder 156. Here, the decoder 156 transmits a signal to the selector 155A such that an output of the adder 152A, which indicates the address of the program code and has priority 1, an output of the adder 152B, which indicates the address of the data path circuit information and has priority 2, and an output of the adder 152C, which indicates the address of the operating unit circuit information and has priority 3, are transmitted to the code buffer 13.

Here, assuming that the selector 155A selects an output of the adder 152A according to the output from the decoder 156, and transmits the selected output to the code buffer 13, the code buffer 13 transmits the program code, which is specified by the address received from the code transmission controller 15, to the controller 11.

An output from the decoder 156 to the selector 155A is also input to the counter 151A and the selector 155B.

The counter 151A receives an output from the decoder 156 and adds "+1" to the received output. Here, a value of the counter 151A is changed from the initial value "0" to "1," and then the adder 151A outputs "the start address of the program code +1". Thereafter, when the selector 155A selects the output of the adder 151A according to the output from the decoder 156, "the start address of the program code +1", "the start address of the program code +2", . . . are sequentially transmitted to the code buffer 13.

The selector 155B receives the output from the decoder 156 and selects and outputs one of an output of the counter 151A, an output of the counter 151B, and an output of the counter 115D combined with an output of the latch 150H as a bit string.

The selector 155B receives the output from the decoder 156 and selects and outputs one of (1) an output of the counter 151A, (2) an output of the counter 151B, and (3) a bit string that is obtained by combining an output of the counter 115D and an output of the latch 150H.

If the selector 155A selects the output of the adder 152A, the selector 155B selects the output of the counter 151A. Similarly, if the selector 155A selects the output of the adder 152B, the selector 155B selects the output of the counter 151B. If the selector 155A selects the output of the adder 152C, the selector 155B selects a bit string including the output of the counter 151D and the value of the latch 150H.

If the selector 155A selects the output of the adder 152A, one input of the AND logic 157F becomes "1." Similarly, if the selector 155A selects the output of the adder 152B, one input of the AND logic 157E becomes "1."

The AND logic units 157E and 157F perform an AND operation for the output of the decoder 156 and the data process busy signal "0" input from the controller 11. If the data process busy signal is "1," the program code and the data path circuit information are not allowed to be transmitted. If the data process busy signal is "0," the program code and the data path circuit information are allowed to be transmitted.

The comparator 153D compares a program code progress state input from the controller 11 with a value of the counter 151A indicating a differential address of the program code. The comparator 153D outputs "1" if the program code progress state does not match the value of the counter 151A, and outputs "0" otherwise.

The comparator 153E compares a data path circuit information progress state input from the controller 11 with a value of the counter 151B indicating a differential address of the data path circuit information. The comparator 153E outputs "1" if the data path circuit information progress state does not match the value of the counter 151B, and outputs "0" otherwise.

The OR logic units 158A and 158B perform an OR operation for the outputs of the comparators 153D and 153E and the outputs of the AND logic units 157F and 157E, and output results of the OR operation, that is, code tag 1 and code tag 2, to the controller 11. Values of the counter 151C are output as code tags 3, 4 and 5 to the controller 11. Each of the code tags 1 to 5 of the total of 5 bits is an output of one bit and indicates the kind of information transmitted from the code buffer 13 to the controller 11.

If the values of the counters 151A, 151B and the 151D do not match the values stored in the latches 150B, 150D and 150F, respectively, the comparators 153A to 153C output "1,", and output "0" otherwise.

The counter 151C is a saturated counter that repeats "0", "1", "2", "3", "4", "0", "1," . . . , etc. When the output of the adder 152C is five times selected by the selector 155A and a value of the counter 151 becomes "4," an output of the comparator 154 becomes "1" and "1" is added to a value of the counter 151D. This is to consider that the operating unit circuit information is transmitted to each of the five operating units 10A to 10E.

For example, the comparator 153 compares the value of the counter 151A with the value stored in the latch 150B. The value of the counter 151A is a differential address indicating that data (program data) stored in which region on the code buffer 13 is transmitted to the controller 11 on the basis of the start address of the program code. The value stored in the latch 150B is a size of the program code. On this account, the match of the value of the counter 151A with the value stored in the latch 150B means the completion of transmission of the program code stored in the code buffer 13 to the controller 11.

When the transmission of the program code is ended, the comparator 153A outputs "0." When the transmission of the program code is not yet ended, the comparator 153A outputs "1." Similarly, when the transmission of the data path circuit information is ended, the comparator 153B outputs "0." When the transmission of the data path circuit information is not yet ended, the comparator 153B outputs "1." When the transmission of the operating unit circuit information is ended, the comparator 153C outputs "0." When the transmission of the operating unit circuit information is not yet ended, the comparator 153C outputs "1."

The outputs of the comparators 153A to 153C are input to the decoder 156 via the AND logic units 157A and 157B. The decoder 156 controls a selection in the selector 155A, that is, a selection of a differential address transmitted to the code buffer 13, based on the information on whether or not the transmission of the program code, the data path circuit information and the operating unit circuit information is ended.

When the transmission of the program code, the data path circuit information and the operating unit circuit information is all ended and thus all the outputs of the comparators 153A to 153C become "0," an output of the OR logic 158C becomes "1."

When the output of the OR logic 158C becomes "1" and the valid signal is "1," the AND logic 157C outputs "1."The output "1" of the AND logic 157C indicates that all of the program code, the data path circuit information and the operating unit circuit information are transmitted to the controller 11 based on the valid data transmission request information.

The output of the AND logic 157C is transmitted, as data process start notification, to the controller 11, and is transmitted, as code transmission request completion notification, to the code transmission request storage 14.

The output "1" of the AND logic 157C inverts an output of the latch 150H that repeats "1" and "0." A value of the latch 150H is used as the most significant bit of the differential address of the operating unit circuit information. The output "1" of the AND logic 157C inverts a value of the latch 150G. The value of the latch 150G is transmitted, as an invalidation signal, to the controller 11.

Figure 4:
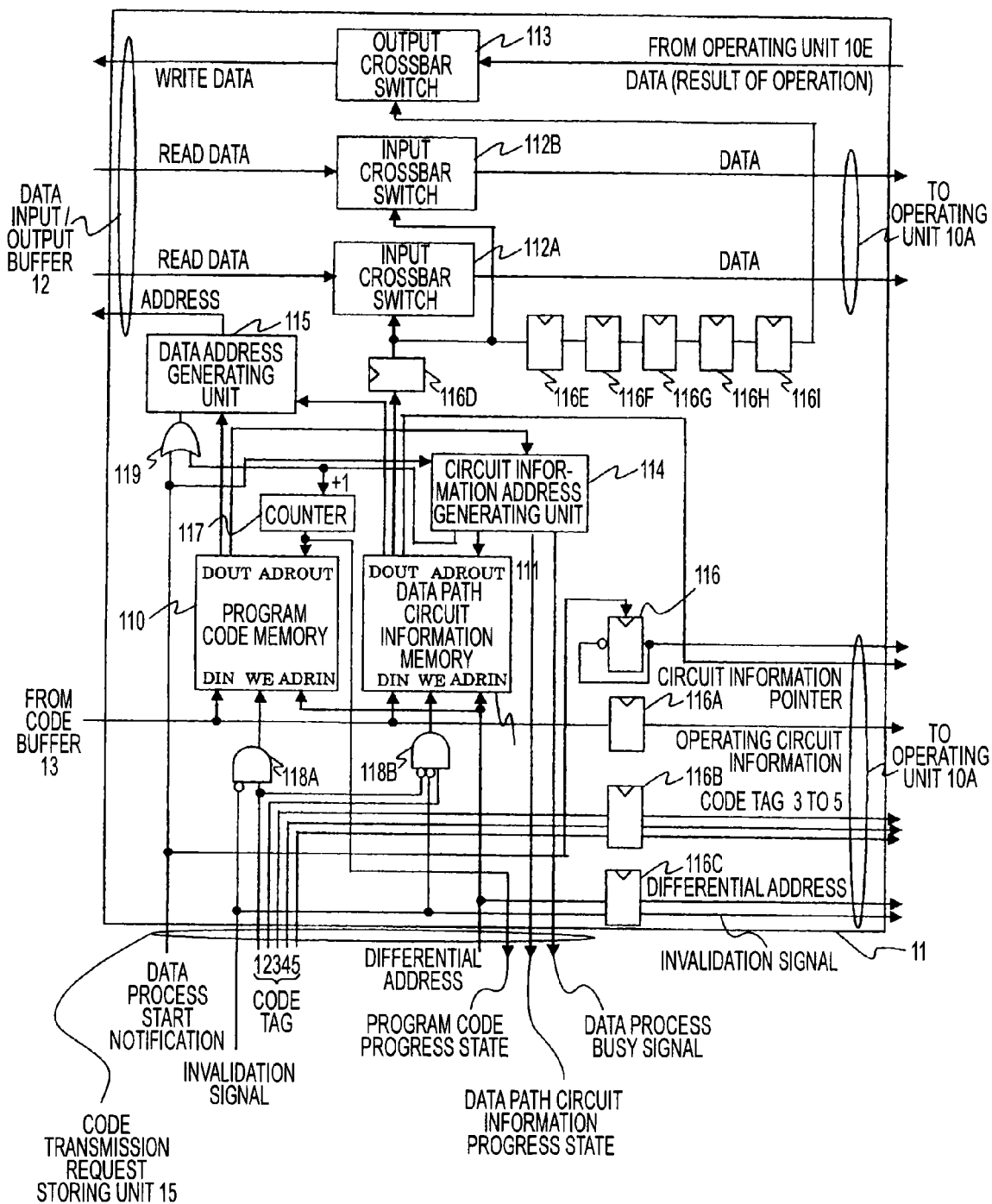
FIG. 4 is a block diagram showing a configuration of a controller according to the embodiment.

FIG. 4 is a block diagram showing a configuration of the controller 11.

The controller 11 includes a program code memory 110, a data path circuit information memory 111, input crossbar switches 112A and 112B, an output crossbar switch 113, an circuit information address generating unit 114, a data address generating unit 115, latches 116 and 116A to 116I, a counter 117, AND logic units 118A and 118B, and an OR logic 119.

The controller 11 reads data out of the data input/output buffer 12 and outputs the read data to the operating unit 10A. The controller 11 writes the data received from the operating unit 10E into the data input/output buffer 12. The controller 11 transmits address for read/write of data from/into the data input/output buffer 12 to the data input/output buffer 12.

The controller 11 receives the data process start notification, the invalidation signal, code tags 1 to 5, and the differential address from the code transmission controller 15. The controller 11 receives the program code, the data path circuit information and the operating unit circuit information, which are transmitted by the code transmission controller 15, from the code buffer 13.

The program code memory 110 has a DIN (Data In) port through which write data are input, a WE (Write Enable) port through which a signal indicating whether or not the data input from the DIN port are written is input, an ADRIN (Address In) port through which an address in which the data input from the DIN port are written is input, a DOUT (Data Out) port through which read data are output, and an ADROUT (Address Out) port through which an address of the data output from the DOUT port is input.

The data path circuit information memory 111 has a DIN (Data In) port through which write data are input, a WE (Write Enable) port through which a signal indicating whether or not the data input from the DIN port are written is input, an ADRIN (Address In) port through which an address in which the data input from the DIN port are written is input, a DOUT (Data Out) port through which read data are output, and an ADROUT (Address Out) port through which an address of the data output from the DOUT port is input.

Initialization Process

First, a process of the controller 11 when the program code is transmitted from the code transmission request control unit 15 will be described.

The controller 11 receives the invalidation signal, the code tags and the differential address from the code transmission controller 15 and receives the program code from the code buffer 13. The invalidation signal is "0" indicating that the program code transmitted to the controller 11 is valid. Code tag 1 is "1" indicating that the program code is transmitted to the controller 11. The differential address is a differential value indicating a degree of deviation of the address of the program code in the code buffer 13, which is transmitted to the controller 11, on the basis of the start address of the program code.

Since code tag 1 is "1" and the invalidation signal is "0," an output of the AND logic 118A becomes "1" and an output of the AND logic 118B becomes "0." On this account, The WE port of the program code memory 110 becomes "1" indicating a writable state.

The differential address received from the code transmission controller 15 is input to the ADRIN port of the program code memory 110. The program code received from the code buffer 13 is input to the DIN port of the program code memory 110.

On this account, the program code received from the code buffer 13 is stored in a region in the program code memory 110, which is specified by the differential address received from the code transmission controller 15.

Second, a process of the controller 11 when the data path circuit information is transmitted from the code transmission request control unit 15 will be described.

The controller 11 receives the invalidation signal, the code tags and the differential address from the code transmission controller 15 and receives the data path circuit information from the code buffer 13. The invalidation signal is "0" indicating that the data path circuit information transmitted to the controller 11 is valid. Code tag 1 is "0" and code tag 2 is "1" indicating that the data path circuit information is transmitted to the controller 11. The differential address is a differential value indicating a degree of deviation of the address of the data path circuit information in the code buffer 13, which is transmitted to the controller 11, on the basis of the start address of the data path circuit information.

Since code tag 1 is "0," code tag 2 is "1" and the invalidation signal is "0," an output of the AND logic 118A becomes "0" and an output of the AND logic 118B becomes "1." On this account, The WE port of the data path circuit information memory 111 becomes "1" indicating a writable state.

The differential address received from the code transmission controller 15 is input to the ADRIN port of the data path circuit information memory 111. The data path circuit information received from the code buffer 13 is input to the DIN port of the data path circuit information memory 111.

On this account, the data path circuit information received from the code buffer 13 is stored in a region in the data path circuit information memory 111, which is specified by the differential address received from the code transmission controller 15.

Third, a process of the controller 11 when the operating unit circuit information is transmitted from the code transmission request control unit 15 will be described.

The controller 11 receives the invalidation signal, the code tags and the differential address from the code transmission controller 15 and receives the operating unit circuit information from the code buffer 13. The invalidation signal is "0" indicating that the operating unit circuit information transmitted to the controller 11 is valid. Code tag 1 is "0" and code tag 2 is "0" indicating that the operating unit circuit information is transmitted to the controller 11. The differential address is a differential value indicating a degree of deviation of the address of the operating unit circuit information in the code buffer 13, which is transmitted to the controller 11, on the basis of the start address of the operating unit circuit information.

Since code tag 1 is "0," code tag 2 is "0" and the invalidation signal is "0," outputs of the AND logic units 118A and 118B become "0." On this account, The WE ports of the program code memory 110 and the data path circuit information memory 111 become "0" indicating a non-writable state.

The operating unit circuit information received from the code buffer 13 is transmitted to the operating unit 10A via the latch 116A. The differential address received from the code transmission controller 15 is transmitted to the operating unit 10A via the latch 116C. Code tags 3 to 5 received from the code transmission controller 15 are transmitted to the operating unit 10A via the latch 116B.

Whenever the data process start notification is received from the code transmission controller 15, an output of the latch 116, which is inverted from "0" to "1" or from "1" to "0," is transmitted to the operating unit 10A.

The output of the latch 116 is assumed to be the most significant bit of a code tag for an operating unit. Code tags 3 to 5 as the output of the latch 116B are assumed to be 2 to 4 bits of the code tag of the operating unit. The differential address as the output of the latch 116C is assumed to be 5 to 6 bits of the code tag of the operating unit.

The operating unit circuit information and the operating unit code tags (including the output of the latch 116, code tags 3 to 5, and the differential address) are sequentially transmitted to the operating units 10B to 10E. The operating units 10A to 10E store the received operating unit circuit information simultaneously in regions specified by the received 6-bit operating unit code tags.

Data Process

Next, an operation of the controller 11 when the controller 11 performs the data process based on the program code stored in the program code memory 110 and the data path circuit information stored in the data path circuit information memory 111 will be described.

First, the counter 117 is initialized to "0." The value "0" of the counter 117 is input to the ADROUT port of the program code memory 110. The DOUT port of the program code memory 110 outputs the repetition range and the repetition number to the circuit information address generating unit 114 and outputs addresses to the data address generating unit 115 according to the program code stored in a region of address 0.

Figure 5:
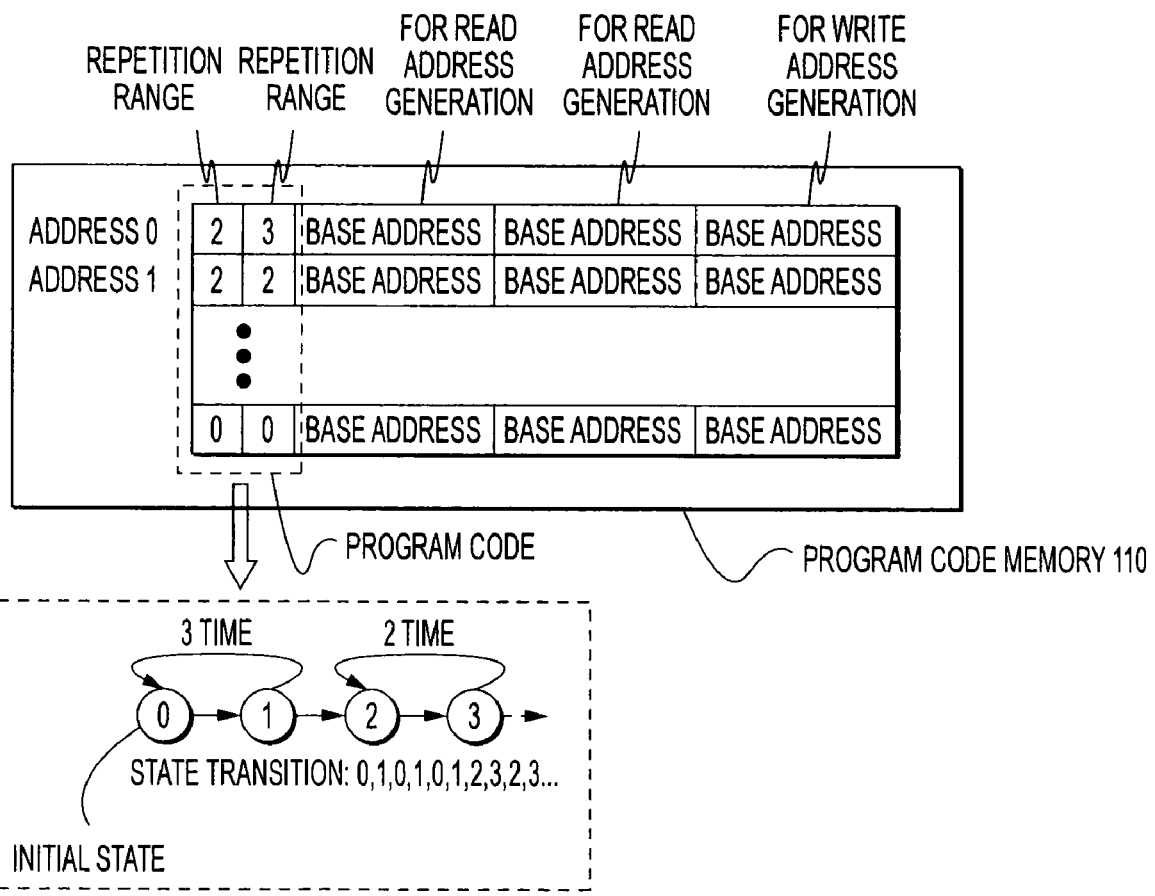
FIG. 5 is a view showing an example of a program code stored in a program code memory.

FIG. 5 is a view showing an example of the program code stored in the program code memory 110. The program code memory 110 stores the program code and three base address information for each address.

The program code is read in order from address 0. The program code defines a state transition of the controller 11. The program code is composed of unit codes having the repetition range and the repetition number in the state transition. The unit codes may define at least one state transition of the controller 11.

One unit code is stored in each address of the program code memory 110. The program code is read and executed in order for each unit code by the controller 11.

For example, by executing a unit code "repetition range: 2" and "repetition number: 3" stored in address 0 of the program code memory 110, the controller 11 performs the state transition such as "first: state 0", "second: state 1", "third: state 0", "fourth: state 1", "fifth: state 0", and "sixth: state 1".

Subsequently, by executing a unit code "repetition range: 2" and "repetition number: 2" stored in address 1 of the program code memory 110, the controller 11 performs the state transition such as "seventh: state 2", "eighth state 3", "ninth: state 2", and "tenth: state 3".

In this manner, the controller 11 continues the state transition according to the program code up to termination of the program code. The "repetition number" of the termination of the program code is set to be "0."

The base address information is information used to generate an address of the data input/output buffer 12 and stored in association with the unit code of the program code.

The three base address information stored in each address of the program code memory 110 is respectively used to generate two addresses used to read data (read data) used for the operation process of each of the operating units 10A to 10E out of the data input/output buffer 12 and one address used to write a result (write data) of the operation process of each of the operating units 10A to 10E in the data input/output buffer 12.

In addition, the three base address information stored in the program code memory 110 in association with the unit code is used to generate addresses (the address of the write data and the addresses of the read data) of the data input/output buffer 12 while the controller 11 performs the state transition by executing the unit code. In addition, the base address information may be stored in the program code memory 110 and may be stored in other storages in association with the unit code of the program code.

Next, the data address generating unit 115 generates a data input/output buffer address by adding the base address information input from the program code memory 110 and offset information input from the data path circuit information memory 111 at a cycle at which a new unit code is read from the program code memory 110.

The data address generating unit 115 generates a data input/output buffer address by adding the data input/output buffer address generated in the previous cycle and the offset information input from the data path circuit information memory 111 at a cycle at which a new unit code is not read from the program code memory 110. The generated data input/output buffer address is used for read/write of data from/into the data input/output buffer 12.

The data address generating unit 115 determines that a new unit code is read when an output of the OR logic 119 is "1," that is, the data process start notification received from the code transmission request control unit 15 is "1," or "+1" is added to a value the counter 117 by the circuit information address generating unit 114.

The circuit information address generating unit 114 generates the data path circuit information address sequentially according to state numbers derived from the repetition range and the repetition number output from the ADROUT port of the program code memory 110, and outputs the generated data path circuit information address sequentially to the ADROUT port of the data path circuit information memory 111.

The circuit information address generating unit 114 outputs all the state numbers defined by the repetition range and the repetition number of address 0 of the program code memory 110, and then adds "+1" to the value of the counter 117. The value "1" of the counter 117 is input to the ADROUT port of the program memory code 110. Then, the repetition range and the repetition number of address 1 of the program code memory 110 are newly input to the circuit information address generating unit 114 for subsequent process.

Next, after the data path circuit information address is input from the circuit information address generating unit 114 to the ADROUT port of the data path circuit information memory 111, the DOUT port of the data path circuit information memory 111 outputs the data path circuit information stored in a region specified by the data path circuit information address.

Figure 6:
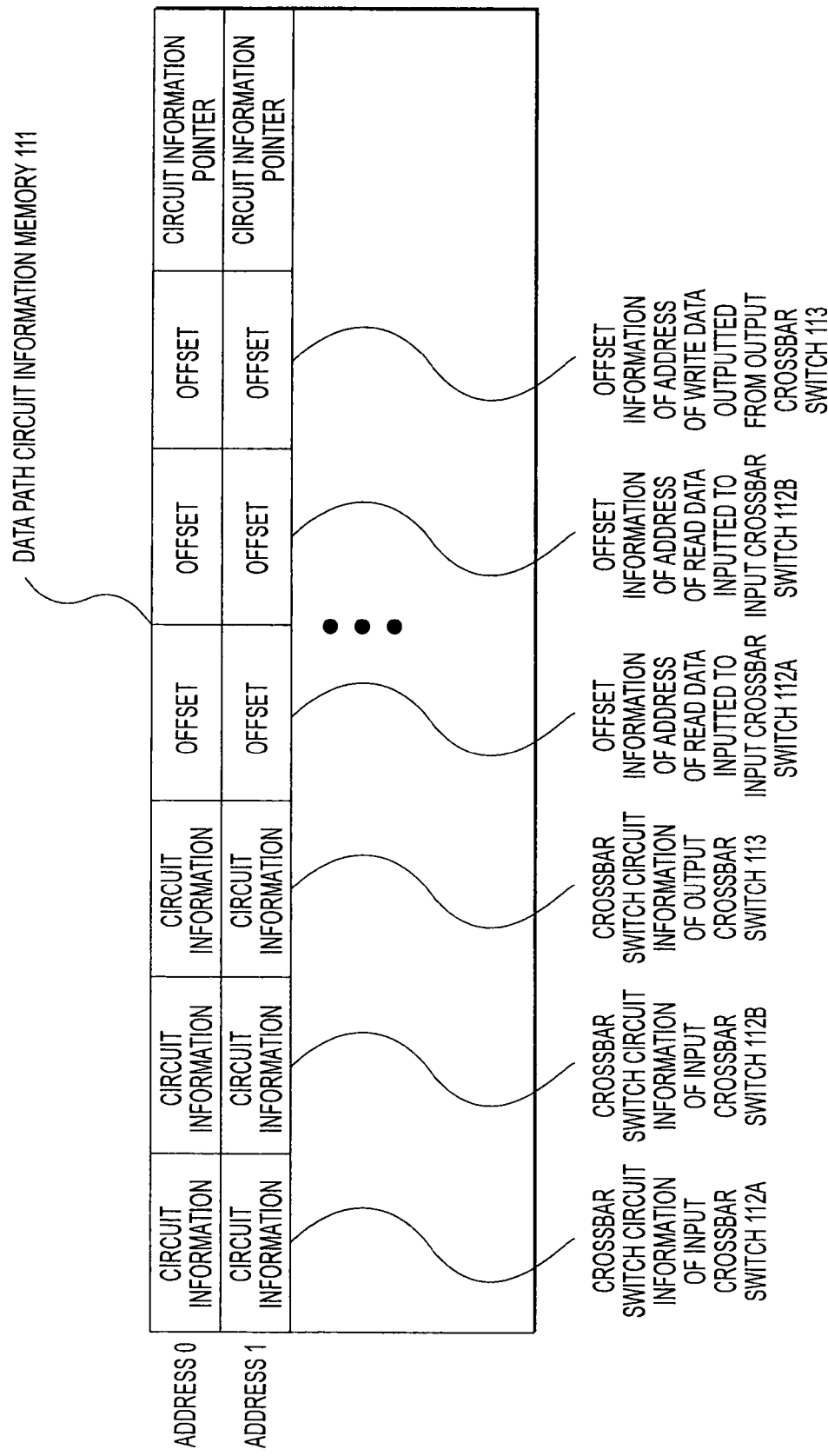
FIG. 6 is a view showing a configuration of data path circuit information stored in a data path circuit information memory.

FIG. 6 is a view showing an example of the data path circuit information stored in the data path circuit information memory 111.

The data path circuit information includes three crossbar switch circuit information, three offset information, and a circuit information pointer for each address.

The crossbar switch circuit information indicates a method of changing arrangement of an input bit string in the input crossbar switches 112A and 112B and the output crossbar switch 113.

The three offset information is used to generate the read address in the read of data from the data input/output buffer 13 and the write address in the write of data into the data input/output buffer 13 (data input/output buffer addresses).

The three offset information is differential values of the two read addresses and the write address respectively on the basis of the base address information. As the offset information and the base address information are added, the read address and the write address are generated. The offset information may be any type of information sufficient enough to generate read addresses and write address from the base address information.

The read address refers to an address used for the controller 11 to read data from the data input/output buffer 13. The data of the data input/output buffer 13, which is specified by the read address, is input to the input crossbar switch 112A. The write address refers to an address used for the controller 11 to write data into the data input/output buffer 13. The data output from the output crossbar switch 113 is written into a storage region specified by the write address.

The circuit information pointer indicates which operating unit circuit information stored in the operating units 10A to 10E is to be used for operation.

Next, the data path circuit information memory 111 outputs the data path circuit information according to the data path circuit information address. That is, the DOUT port of the data path circuit information memory 111 outputs the offset information to the data address generating unit 115. The DOUT port of the data path circuit information memory 111 outputs the crossbar switch circuit information to the input crossbar switches 112A and 112B and the output crossbar switch 113. As the crossbar switch circuit information passes through the latches 116D to 116I, a timing at which the crossbar switch circuit information is input to the input crossbar switches 112A and 112B and the output crossbar switch 113 is adjusted. The DOUT port of the data path circuit information memory 111 outputs the circuit information pointer to the operating unit 10A. The circuit information pointer is transmitted to the operating units 10B to 10E in order along with data in the data process.

Next, the input crossbar switches 112A and 112B receive the read data specified by the data input/output buffer address generated by the data address generating unit 115, change arrangement of a bit string of the data according to the input crossbar switch circuit information, and transmit the changed arrangement of the bit string of the data to the operating unit 10A.

The output crossbar switch 113 changes arrangement of a bit string of the data received from the operating unit 10E according to the input crossbar switch circuit information, and writes the changed arrangement of the bit string of the data, as the write data, into a region specified by the data input/output buffer address generated by the data address generating unit 115.

With the above process, for example, in the operation of "repetition range: 2" and "repetition number: 3" of address 0 shown in FIG. 5, the process performed in the first state transition "first: state 0". Next, the circuit information address generating unit 114 generates the data path circuit information address according to the state number "1" in order to start the process performed in "second: state 1", and outputs the generated data path circuit information address to the ADROUT port of the data path circuit information memory 111. Hereinafter, similarly, the above process is performed.

Thereafter, the state transitions such as "third: state 0", "fourth: state 1", "fifth: state 0", and "sixth: state 1" and processes according to the state transitions are achieved.

Next, the circuit information address generating unit 114 adds "+1" to the value of the counter 117. The value "1" of the counter 117 is input to the ADROUT port of the program code memory 110. Hereinafter, similarly, a process continues according to the program code stored in address 1 of the program code memory 110.

In addition, the counter 117 transmits the value of the counter 117, as a program code progress state, to the code transmission request control unit 15. The circuit information address generating unit 114 transmits the same address as that output to the ADROUT port of the data path circuit information memory 111, as a data path circuit information progress state, to the code transmission request control unit 15. In addition, the circuit information address generating unit 114 transmits a signal, which becomes "0" when the repetition number input from the program code memory 110 is "0," and becomes "1" if the repetition number input from the program code memory 110 is not "0," as a data process busy signal, to the code transmission request control unit 15.

Figure 7:
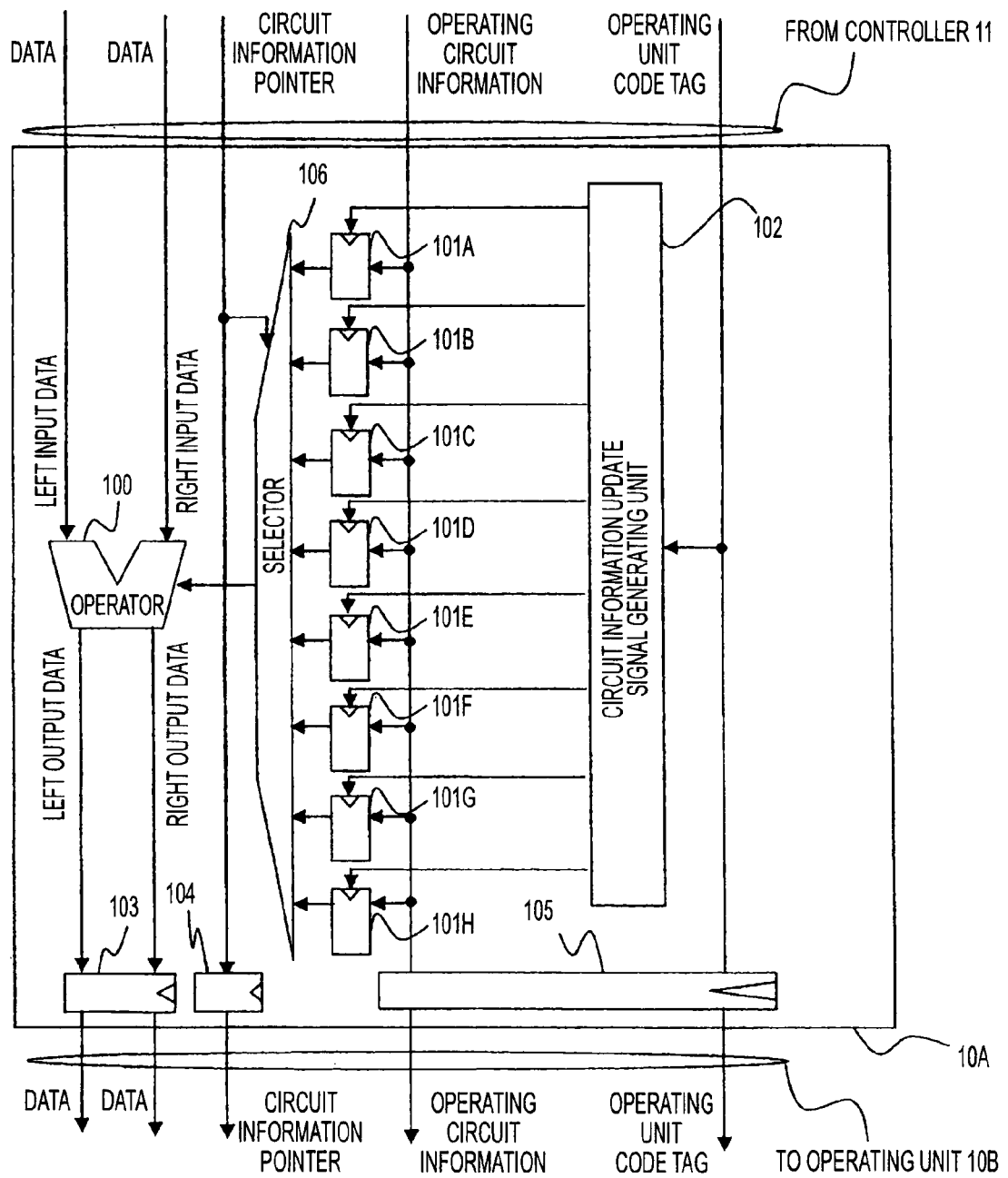
FIG. 7 is a block diagram showing a configuration of an operating unit according to the embodiment.

FIG. 7 is a block diagram showing a configuration of the operating unit 10A. This shown configuration may be also applied to the operating units 10B to 10E.

The operating unit 10A includes an operator 100, circuit information latches 101A to 101H, a circuit information update signal generating unit 102, a data pipeline register 103, a control pipeline register 104, and a code pipeline register 105.

The operating unit 10A receives two data, a circuit information pointer, operating unit circuit information, and an operating unit code tag from the controller 11.

Initialization Process

The operating unit 10A performs an initialization process to store the operating unit circuit information, which is transmitted from the controller 11, in a storage contained in the operating unit 10A. In the initialization process, the operating unit 10A receives operating unit circuit information and an operating unit code tag from the controller 11.

The operating unit code tag is input to the circuit information update signal generating unit 102. The circuit information update signal generating unit 102 maintains all outputs as "0" or outputs "1" to triggers of the circuit information latches 101A to 101H according to the input operating unit code tag. Since the operating unit circuit information is input to each of the circuit information latches 101A to 101H, the operating unit circuit information is stored in an circuit information latch whose trigger is input with "1" by the circuit information update signal generating unit 102.

FIG. 8 is a view showing a correspondence relationship between an operating unit code tag and an circuit information latch in which operating unit circuit information is stored. If the operating unit code tag is "010000", "010001", "010010", and "010011", the operating unit circuit information is stored in the circuit information latches 101A, 101B, 101C and 101D of the operating unit 10A. If the operating unit code tag is "110000", "110001", "110010", or "110011", the operating unit circuit information is stored in the circuit information latches 110E, 101F, 101G and 101H of the operating unit 10A. If the operating unit code tag is neither "010000" to "010011" nor "110000" to "110011", the operating unit circuit information is not stored in the circuit information latches 101A to 101H of the operating unit 10A.

The operating unit circuit information and the operating unit code tag received by the operating unit 10A are stored in the code pipeline register 105, and are transmitted to the next operating unit 10B at the next cycle.

In the following, the same process is performed in the operating units 10B to 10E. The operating unit 10E may not have the code pipeline register 105.

Data Process

The operating unit 10A receives two data and a circuit information pointer from the controller 11. The two data are input to the operator 100 and the circuit information pointer is input to the selector 106.

The selector 106 outputs one of the operating unit circuit information stored in the circuit information latches 101A to 101H to the operator 100 according to the input circuit information pointer. The operator 100 performs the operation process based on the input operating unit circuit information.

Figure 9:
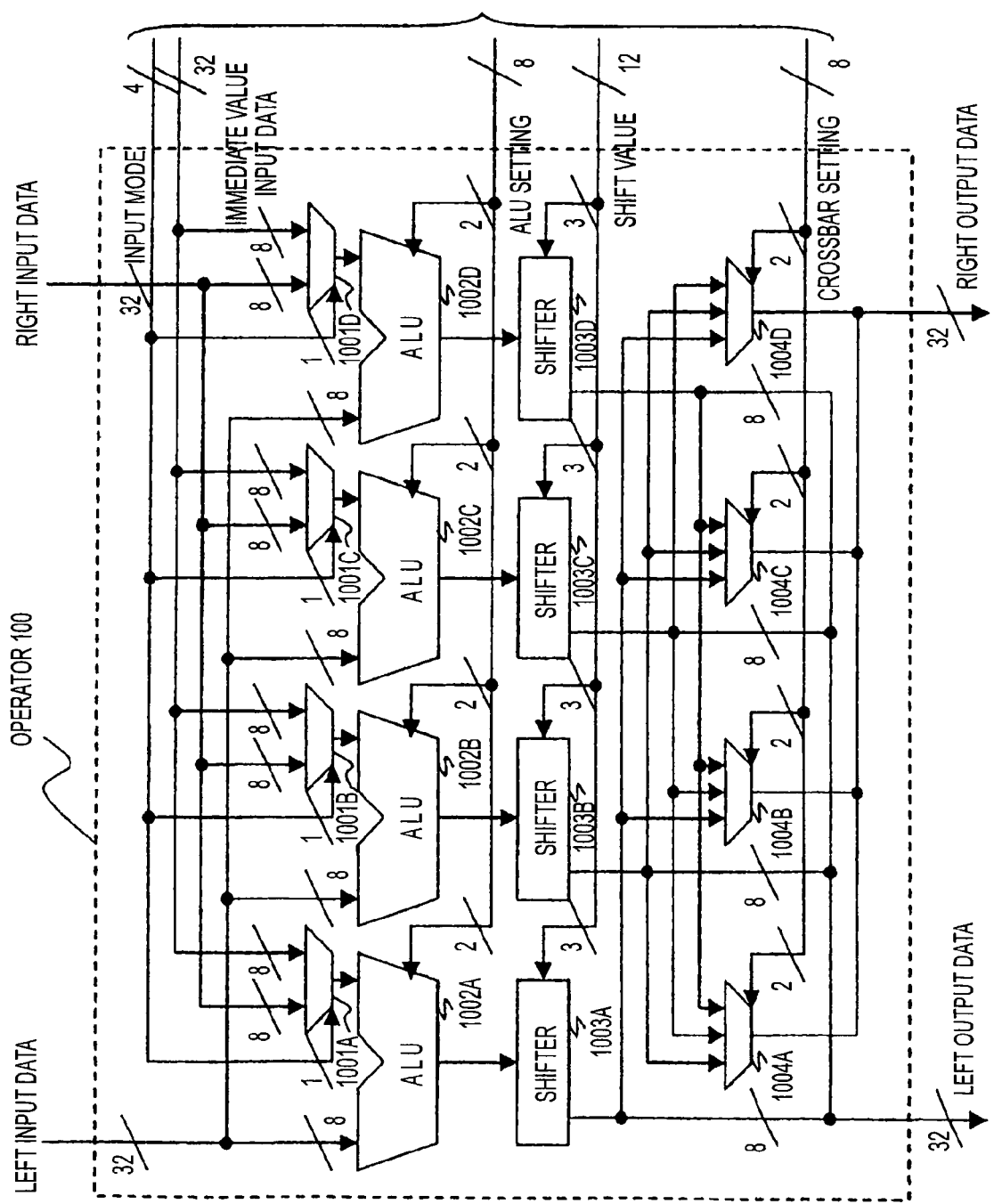
FIG. 9 is a block diagram showing a configuration of an operator according to the embodiment.

FIG. 9 is a block diagram showing an example of a configuration of the operator 100.

The operator 100 includes selectors 1001A to 1001D and 1004A to 1004D, ALUs (Arithmetic Logic Units) 1002A to 1002D, and shifters 1003A to 1003D.

The operator 100 is input with two 32-bit data. In the following description, one data is called right input data and the other data is called left input data.

The operator 100 is input with 64-bit operating unit circuit information. The 64-bit operating unit circuit information includes a 4-bit input mode, 32-bit immediate value input data, 8-bit ALU setting, a 12-bit shift value, and 8-bit crossbar setting.

The selectors 1001A to 1001D have their respective one input terminals input with the right input data and their respective other input terminals input with the immediate value data. Each of the selectors 1001A to 1001D is input with one bit of the 4-bit input mode. The selectors 1001A to 1001D select and output the right input data when the input mode is "1," and select and output the immediate value input data when the input mode is "0."

The ALUs 1002A to 1002D have their respective one input terminals input with the left input data and their respective other input terminals input with the outputs of the selectors 1001A to 1001D. Each of the ALUs 1002A to 1002D is input with two bits of the 8-bit ALU setting. The ALUs 1002A to 1002D perform the operation process for two data according to the input 2-bit ALU setting.

The shifters 1003A to 1003D are respectively input with the outputs of the ALUs 1002A to 1002D. Each of the shifters 1003A to 1003D is input with three bits of the 12-bit shift value. The shifters 1003A to 1003D bit-rotates only a shift value of the input three bits in a predetermined direction. Outputs of the shifters 1003A to 1003D are combined together and are output as left output data of the operator 100.

The selector 1004A is input with the outputs of the shifters 1003B, 1003C and 1003D. The selector 1004B is input with the outputs of the shifters 1003A, 1003C and 1003D. The selector 1004C is input with the outputs of the shifters 1003A, 1003B and 1003D. The selector 1004D is input with the outputs of the shifters 1003A, 1003B and 1003C.

Each of the selectors 1004A to 1004D is input with two bits of the 8-bit crossbar setting. Each of the selectors 1004A to 1004D selects and outputs one of three inputs according to a crossbar setting value of the input two bits. Outputs of the selectors 1004A to 1004D are combined together and are output as right output data of the operator 100.

The data pipeline register 103 stores the left output data and right output data of the operator 100 and transmits the stored data to the subsequent operating unit 10B at the next cycle. The control pipeline register 104 stores the circuit information pointer received from the controller 11 at the same cycle and transmits the stored pointer to the subsequent operating unit 10B at the next cycle.

In the following, the same process is performed in the operating units 10B to 10E. The operating unit 10E may not have the control pipeline register 104.

Figures 10, 11:
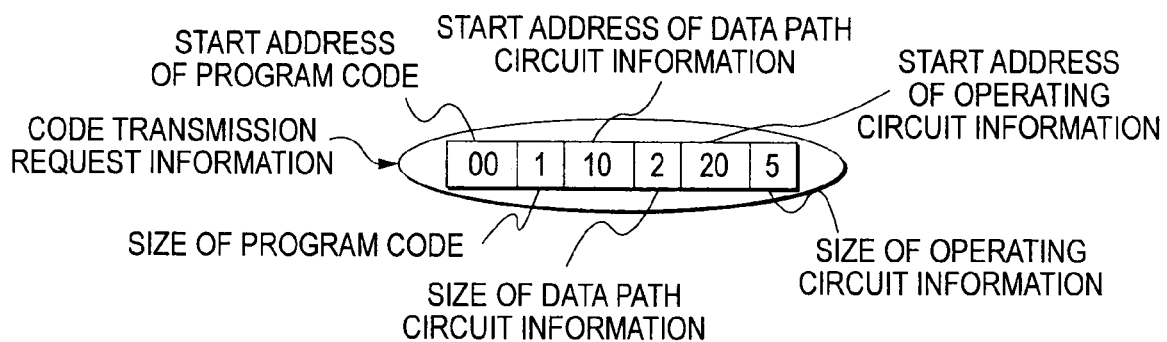
FIG. 10 is a view showing an example of program code stored in a program code memory.
FIG. 11 is a view showing an example of code transmission request processed in a code transmission controller.

FIG. 10 is a view showing an example of the program code stored in the program code memory 110. FIG. 11 is a view showing an example of the code transmission request information processed in the code transmission controller 15.

Figure 12:
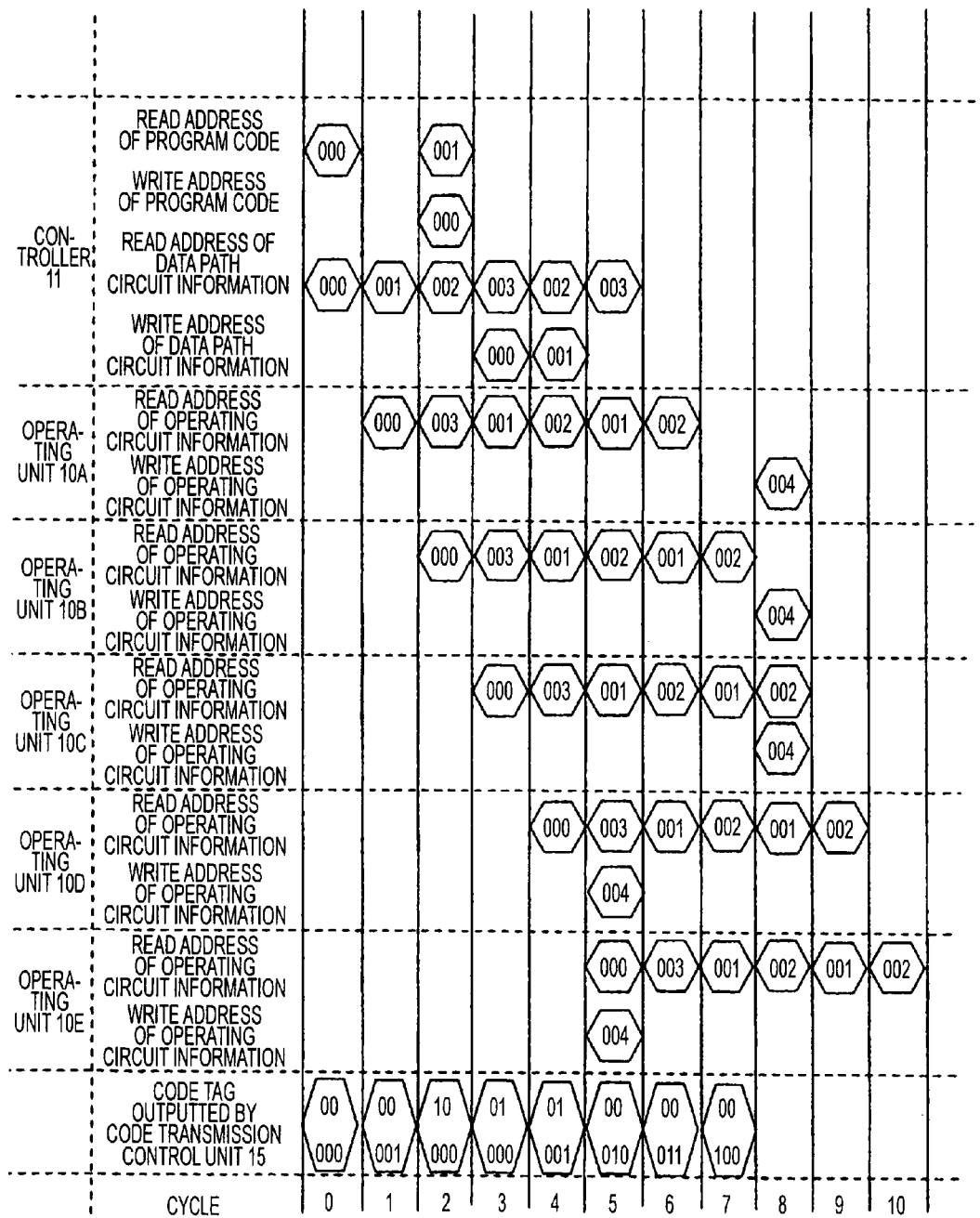
FIG. 12 is a view showing operation flow of a controller and each operating unit for each cycle.

FIG. 12 is a view showing operation flow of the controller 11, the operating units 10A to 10E and the code transmission controller 15 according to the program code shown in FIG. 10 and the code transmission request information shown in FIG. 11. It is assumed that the data input/output buffer 12 and the code buffer 13 output read data at a cycle at which a read request is accepted.

In the following description, it is assumed that the most significant bit of the operating unit code tag is set to "1." Then, the operating units 10A to 10E perform the operation process using only the operating unit circuit information stored in the respective circuit information latches 101A to 101D. In addition, the operating units 10A to 10E write the operating unit circuit information, which is transmitted in order from the controller 11, into the respective circuit information latches 101E to 101H.

In addition, when the most significant bit of the operating unit code tag is set to "0," the operating units 10A to 11E perform the operation process using only the operating unit circuit information stored in the respective circuit information latches 101E to 101H. In addition, the operating units 10A to 10E write the operating unit circuit information, which is transmitted in order from the controller 11, into the respective circuit information latches 101A to 101D.

[Cycle 0]

First, the controller 11 reads the program code stored in address 0 of the program code memory 110. The read program code is described with the repetition range of "2" and the repetition number of "1."

Next, since the repetition range is "2" and the repetition number is "1," the controller 11 reads address 0 of the data path circuit information memory 111. In addition, the controller 11 reads address 1 at cycle 1. The controller 11 transmits data and a circuit information pointer "0" to the operating unit 10A according to the read data path circuit information and starts a first data process.

While the controller 11 performs the data process, the controller 11 transmits a data process busy signal "1" to the code transmission controller 15 and, at the same time, transmits a program code progress state "0" and a data path circuit information progress state "0" to the code transmission controller 15. Since the data process busy signal is "1" and the program code progress state and the data path circuit information progress state are "0," the code transmission controller 15 can transmit only the operating unit circuit information but is prohibited from transmission of the program code and the data path circuit information.

In order to store the operating unit circuit information in the circuit information latch 101E of the operating unit 10E, the code transmission controller 15 transmits the operating unit circuit information and code tag "00000" from the code buffer 13 to the controller 11. Since code tag 1 is "0" and code tag 2 is "0," the operating unit circuit information cannot be stored in the program code memory 110 and the data path circuit information memory 111. Since code tag 3 is "0," code tag 4 is "0," and code tag 5 is "0," the operating unit circuit information is stored in the operating unit 10E. In addition, the operating unit circuit information is input to the operating unit 10E after 5 cycles and is stored in the circuit information latch 110E.

[Cycle 1]

The controller 11 continues to execute the program code (including the repetition range of "2" and the repetition number of "1") read at cycle 0. The controller 11 reads address 1 of the data path circuit information memory 111. The controller 11 transmits data and a circuit information pointer "3" to the operating unit 1A according to the read data path circuit information and starts a second data process.

While the controller 11 performs the data process, the controller 11 transmits a data process busy signal "1" to the code transmission controller 15 and, at the same time, transmits a program code progress state "0" and a data path circuit information progress state "0" to the code transmission controller 15. Since the data process busy signal is "1" and the program code progress state and the data path circuit information progress state are "0," the code transmission controller 15 can transmit only the operating unit circuit information but is prohibited from transmission of the program code and the data path circuit information.

In order to store the operating unit circuit information in the circuit information latch 101E of the operating unit 10D, the code transmission controller 15 transmits the operating unit circuit information and code tag "00001" from the code buffer 13 to the controller 11. Since code tags 1 and 2 are "0," the operating unit circuit information cannot be stored in the program code memory 110 and the data path circuit information memory 111. Since code tag 3 is "0," code tag 4 is "0," and code tag 5 is "1," the operating unit circuit information is stored in the operating unit 10D. In addition, the operating unit circuit information is input to the operating unit 10D after 4 cycles and is stored in the circuit information latch 110E.

The operating unit 10A reads the operating unit circuit information from the circuit information latch 101A specified by the circuit information pointer "0" received from the controller 11 and inputs the read operating unit circuit information to the operator 100. The operator 100 performs the operation process for the data received from the controller 11 according to the input operating unit circuit information.

[Cycle 2]

The controller 11 reads the program code stored in address 1 of the program code memory 110. The read program code is described with the repetition range of "2" and the repetition number of "2."

Next, since the repetition range is "2" and the repetition number is "2," the controller 11 reads address 2 of the data path circuit information memory 111. In addition, the controller 11 reads address 3 at cycle 3, address 2 at cycle 4, and address 3 at cycle 5. The controller 11 transmits data and a circuit information pointer "1" to the operating unit 10A according to the read data path circuit information and starts a third data process.

The controller 11 continues to transmit a data process busy signal "1" to the code transmission controller 15 and, at the same time, transmit a program code progress state "1" and a data path circuit information progress state "2". Since the data process busy signal is "1," the program code progress state is "1" and the data path circuit information progress state is "2," the code transmission controller 15 is partially allowed to transmit the program code and the data path circuit information.

The program code and the data path circuit information transmitted by the code transmission controller 15 are stored in a storage region (address 0) of the program code memory 110 in which the executed program code is stored and storage regions (addresses 0 and 1) of the data path circuit information memory 111 in which the used data path circuit information is stored.

In addition, the operating unit circuit information can be also transmitted, and the code transmission controller 15 transmits the program code, the data path circuit information and the operating unit circuit information in a priority order.

In order to store the program code in the program code memory 110, the code transmission controller 15 transmits a start address "00" of the program code to the code buffer 13 and transmits code tag "10000" to the controller 11. Since code tag 1 is "1," the program code is stored in the program code memory 110.

The program code is stored in a storage region in which the program code executed at cycles 0 and 1 is stored, that is, in address 0 of the program code memory 110.

The operating unit 10A reads the operating unit circuit information from the circuit information latch 101D specified by the circuit information pointer "3" received from the controller 11 and performs the operation process for the data received from the controller 11 according to the read operating unit circuit information.

The operating unit 10B reads the operating unit circuit information from the circuit information latch 101A specified by the circuit information pointer "0" received from the operating unit 10A and performs the operation process for the data received from the operating unit 10A according to the read operating unit circuit information.

[Cycle 3]

The controller 11 continues to execute the program code (including the repetition range of "2" and the repetition number of "2") read at cycle 1. The controller 11 reads address 3 of the data path circuit information memory 111. The controller 11 transmits data and a circuit information pointer "2"

to the operating unit 10A according to the read data path circuit information and starts a fourth data process.

The controller 11 transmits a data process busy signal "1," a program code progress state "1" and a data path circuit information progress state "2" to the code transmission controller 15. Since the data process busy signal is "1," the program code progress state is "1" and the data path circuit information progress state is "2," the code transmission controller 15 is partially allowed to transmit the program code and the data path circuit information. In addition, the operating unit circuit information can be also transmitted, and the code transmission controller 15 transmits the program code, the data path circuit information and the operating unit circuit information in a priority order.

Since the size of the program code is "1," the code transmission controller 15 completes the transmission of the program code at cycle 2.

In order to store the data path circuit information in the data path circuit information memory 111, the code transmission controller 15 transmits the data path circuit information from the code buffer 13 and transmits code tag "01000" to the controller 11. Since code tag 1 is "0" and code tag 2 is "1," the data path circuit information is stored in the data path circuit information memory 111.

The data path circuit information is stored in a storage region in which the data path circuit information executed at cycle 0 is stored, that is, in address 0 of the data path circuit information memory 111.

The operating unit 10A reads the operating unit circuit information from the circuit information latch 101B specified by the circuit information pointer "1" received from the controller 11 and performs the operation process for the data received from the controller 11 according to the read operating unit circuit information.

The operating unit 10B reads the operating unit circuit information from the circuit information latch 101D specified by the circuit information pointer "3" received from the operating unit 10A and performs the operation process for the data received from the operating unit 10A according to the read operating unit circuit information.

The operating unit 10C reads the operating unit circuit information from the circuit information latch 101A specified by the circuit information pointer "0" received from the operating unit 10B and performs the operation process for the data received from the operating unit 10B according to the read operating unit circuit information.

[Cycle 4]

The controller 11 continues to execute the program code (including the repetition range of "2" and the repetition number of "2") read at cycle 1. The controller 11 reads address 2 of the data path circuit information memory 111. The controller 11 transmits data and a circuit information pointer "1" to the operating unit 10A according to the read data path circuit information and starts a fifth data process.

The controller 11 transmits a data process busy signal "1," a program code progress state "1" and a data path circuit information progress state "2" to the code transmission controller 15. Since the data process busy signal is "1," the program code progress state is "1" and the data path circuit information progress state is "2," the code transmission controller 15 is partially allowed to transmit the program code and the data path circuit information. In addition, the operating unit circuit information can be also transmitted, and the code transmission controller 15 transmits the program code, the data path circuit information and the operating unit circuit information in a priority order.

Since the size of the program code is "1," the code transmission controller 15 completes the transmission of the program code at cycle 2. Since the size of the data path circuit information is "2," the code transmission controller 15 does not yet complete the transmission of the data path circuit information.

In order to store the data path circuit information in the data path circuit information memory 111, the code transmission controller 15 transmits the data path circuit information from the code buffer 13 and transmits code tag "01001" to the controller 11. Since code tag 1 is "0" and code tag 2 is "1," the data path circuit information is stored in the data path circuit information memory 111.

The data path circuit information is stored in a storage region in which the data path circuit information executed at cycle 1 is stored, that is, in address 1 of the data path circuit information memory 111.

The operating unit 10A reads the operating unit circuit information from the circuit information latch 101C specified by the circuit information pointer "2" received from the controller 11 and performs the operation process for the data received from the controller 11 according to the read operating unit circuit information.

The operating unit 10B reads the operating unit circuit information from the circuit information latch 101B specified by the circuit information pointer "1" received from the operating unit 10A and performs the operation process for the data received from the operating unit 10A according to the read operating unit circuit information.

The operating unit 10C reads the operating unit circuit information from the circuit information latch 101D specified by the circuit information pointer "3" received from the operating unit 10B and performs the operation process for the data received from the operating unit 10B according to the read operating unit circuit information.

The operating unit 10D reads the operating unit circuit information from the circuit information latch 101A specified by the circuit information pointer "0" received from the operating unit 10C and performs the operation process for the data received from the operating unit 10C according to the read operating unit circuit information.

[Cycle 5]

The controller 11 continues to execute the program code (including the repetition range of "2" and the repetition number of "2") read at cycle 1. The controller 11 reads address 3 of the data path circuit information memory 111. The controller 11 transmits data and a circuit information pointer "2" to the operating unit 10A according to the read data path circuit information and starts a sixth data process.

The controller 11 transmits a data process busy signal "1," a program code progress state "1" and a data path circuit information progress state "2" to the code transmission controller 15. Since the data process busy signal is "1," the program code progress state is "1" and the data path circuit information progress state is "2," the code transmission controller 15 is partially allowed to transmit the program code and the data path circuit information. However, new program code and data path circuit information have been already stored in a storage region (address 0) of the program code memory 110 in which the executed program code was stored and storage regions (addresses 0 and 1) of the data path circuit information memory 111 in which the used data path circuit information was stored. On this account, the code transmission controller 15 cannot transmit the program code and the data path circuit information. Thereafter, code transmission controller 15 transmits the operating unit circuit information.

In order to store the operating unit circuit information in the operating unit 10C, the code transmission controller 15 transmits the operating unit circuit information from the code buffer 13 and transmits code tag "00010" to the controller 11. Since code tags 1 and 2 are "0," the operating unit circuit information is not stored in the program code memory 110 and the data path circuit information memory 111. Since code tag 3 is "0," code tag 4 is "1" and code tag 5 is "0," the operating unit circuit information is stored in the operating unit 10C. In addition, the operating unit circuit information is input to the operating unit 10C after 3 cycles, and then is stored in the circuit information latch 110E.

The operating unit 10E receives the operating unit circuit information and the code tag "00000" transmitted by the code transmission controller 15 at cycle 0 and stores the received operating unit circuit information in the circuit information latch 110E. The operating unit 10D receives the operating unit circuit information and the code tag "00001" transmitted by the code transmission controller 15 at cycle 1 and stores the received operating unit circuit information in the circuit information latch 101E.

The operating unit 10A performs the operation process based on the operating unit circuit information specified by the circuit information pointer "1." The operating unit 10B performs the operation process based on the operating unit circuit information specified by the circuit information pointer "2." The operating unit 10C performs the operation process based on the operating unit circuit information specified by the circuit information pointer "1." The operating unit 10D performs the operation process based on the operating unit circuit information specified by the circuit information pointer "3." The operating unit 10E performs the operation process based on the operating unit circuit information specified by the circuit information pointer "0."

[Cycle 6]

The controller 11 reads the program code stored in address 2 of the program code memory 110. Since the repetition range and the repetition number of the program code are all "0," the controller 11 enters into a standby state. Although it is here illustrated, for the sake of simplification of description, that the controller 11 enters into the standby state, the controller 11 may execute other program codes stored in the program code memory 110 or the program code stored at cycle 2 in the program code memory 110.

In order to store the operating unit circuit information in the operating unit 10B, the code transmission controller 15 transmits the operating unit circuit information from the code buffer 13 and transmits code tag "00011" to the controller 11. The operating unit circuit information is input to the operating unit 10B after 2 cycles, and then is stored in the circuit information latch 110E.

The operating unit 10A performs the operation process based on the operating unit circuit information specified by the circuit information pointer "2." The operating unit 10B performs the operation process based on the operating unit circuit information specified by the circuit information pointer "1." The operating unit 10C performs the operation process based on the operating unit circuit information specified by the circuit information pointer "2." The operating unit 10D performs the operation process based on the operating unit circuit information specified by the circuit information pointer "1." The operating unit 10E performs the operation process based on the operating unit circuit information specified by the circuit information pointer "3."

[Cycle 7]

In order to store the operating unit circuit information in the operating unit 10A, the code transmission controller 15 transmits the operating unit circuit information from the code buffer 13 and transmits code tag "00100" to the controller 11. The operating unit circuit information is input to the operating unit 10A after 1 cycle, and then is stored in the circuit information latch 101E.

The operating unit 10B performs the operation process based on the operating unit circuit information specified by the circuit information pointer "2." The operating unit 10C performs the operation process based on the operating unit circuit information specified by the circuit information pointer "1." The operating unit 10D performs the operation process based on the operating unit circuit information specified by the circuit information pointer "2." The operating unit 10E performs the operation process based on the operating unit circuit information specified by the circuit information pointer "1."

[Cycle 8]

The operating unit 10C performs the operation process based on the operating unit circuit information specified by the circuit information pointer "2." The operating unit 10D performs the operation process based on the operating unit circuit information specified by the circuit information pointer "1." The operating unit 10E performs the operation process based on the operating unit circuit information specified by the circuit information pointer "2."

The operating unit 10C receives the operating unit circuit information and the code tag "00010" transmitted by the code transmission controller 15 at cycle 5 and stores the received operating unit circuit information in the circuit information latch 110E.

The operating unit 10B receives the operating unit circuit information and the code tag "00011" transmitted by the code transmission controller 15 at cycle 6 and stores the received operating unit circuit information in the circuit information latch 101E.

The operating unit 10A receives the operating unit circuit information and the code tag "00100" transmitted by the code transmission controller 15 at cycle 7 and stores the received operating unit circuit information in the circuit information latch 110E.

[Cycle 9]

The operating unit 10D performs the operation process based on the operating unit circuit information specified by the circuit information pointer "2." The operating unit 10E performs the operation process based on the operating unit circuit information specified by the circuit information pointer "1."

[Cycle 10]

The operating unit 10E performs the operation process based on the operating unit circuit information specified by the circuit information pointer "2."

As described above, in the semiconductor device 1 according to the embodiment, the operating unit circuit information stored in the circuit information latches 101A to 101H of the operating units 10A to 10E is read according to the circuit information pointers stored in the data path circuit information memory 111. The operating units 10A to 10E perform the operation process specified by the read operating unit circuit information.

The operating unit circuit information on various addresses is read from the circuit information latches 101A to 101H depending on the kind of operation for each cycle. The program code is sequentially read in an address order from the program code memory 110 every several cycles. The data path circuit information is sequentially read from the data path circuit information memory 111 for each cycle according to the program code read from the program code memory 110.

Since the program code is read in an address order, a program code can be newly written during the data process in a storage region in which the executed program code is stored.

Although the data path circuit information is read according to the program code, the same data path circuit information will not be read according to a plurality of program codes. That is, after execution of one program code is completed, the data path circuit information used by the program code will not be used by other program codes. On this account, a program code or data path circuit information can be newly written during the data process in a storage region in which the data path circuit information used by the executed program code is stored.

On this account, there is no need of write of the program code or the data path circuit information in transfer to the next data process, and a process speed of the semiconductor device 1 can be improved since waiting time of the operating units 10A to 10H can be reduced.

In addition, in order to effectively utilize the storage region in which the executed program code or the used data path circuit information is stored, it is possible to make a design to reduce the storage capacity of the program code memory 110 and the data path circuit information memory 111.

Since the operating unit circuit information is read from various addresses for each cycle, it is difficult to discriminate operating unit circuit information not used and operating unit circuit information used. On this account, it is designed for the circuit information latches 101A to 101H to have storage capacity which is two times as high as the amount of operating unit circuit information used for one time data process.

When the first data process is performed, the operating unit circuit information stored in the circuit information latches 101A to 101D is used. During the first data process, the operating unit circuit information used for the second data process is stored in the circuit information latches 101E to 101H. On this account, prior to transfer to the next data process, since the operating unit circuit information used for the next data process can be written into the circuit information latches, there is no need of write of the operating unit circuit information in the transfer to the next data process, and a process speed of the semiconductor device 1 can be improved since waiting time of the operating units 10A to 10H can be reduced.

In addition, only circuit information latches to store the operating unit circuit information read from various addresses for each cycle depending on the kind of operation have storage capacity to store the operating unit circuit information used for the second data process. On this account, it is possible to make a design to reduce the total storage capacity of the program code memory 110, the operating unit circuit information memory 111 and the circuit information latches 101A to 101H.

It is to be understood that the invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A semiconductor device, comprising:
a first storage that stores a program code including unit codes defining a state transition;
a second storage that stores base address information in association with each unit code of the unit codes;
a third storage that stores data;
a fourth storage that stores circuit information that specifies an operation process;
a controller configured to
  sequentially read the program code stored in the first storage to obtain the unit codes;
  read and output the data stored in the third storage;
  read and output the circuit information stored in the fourth storage; and
  transition a state by executing each unit code of the unit codes;
a first operating unit that performs a first operation process that is specified by the circuit information received from the controller for data received from the controller;
a second operating unit that performs a second operation process that is specified by the circuit information received from the controller on a result of the first operation process performed by the first operating unit; and
a fifth storage that stores offset information for generating an address specifying the data read from the third storage and a pointer specifying the circuit information stored in the fourth storage in association with each state to be transitioned by the controller,
wherein the controller is further configured to
  read, from the second storage, the base address information associated with a unit code, of the unit codes, that is being executed;
  read the offset information and the pointer associated with a current state from the fifth storage;
  calculate an address from the read base address information and the read offset information;
  transmit the data stored in the third storage that is specified by the calculated address, to the first operating unit; and
  transmit the circuit information stored in the fourth storage and specified by the read pointer to the first and second operating units.

2. A semiconductor device, comprising:
a first storage that stores a program code including unit codes defining a state transition;
a second storage that stores first base address information in association with each unit code of the unit codes;
a controller that sequentially reads the program code stored in the first storage to obtain the unit codes and transitions a state by executing each unit code of the read unit codes;
a first operating unit that is provided with a third storage that stores first circuit information and performs a first operation process that is specified by the first circuit information for data received from the controller;
a second operating unit that is provided with a fourth storage that stores second circuit information and performs a second operation process specified by the second circuit information on a result of the first operation process performed by the first operating unit;
a fifth storage that stores the data; and
a sixth storage that stores first offset information for generating an address specifying the data read from the fifth storage and a pointer specifying the first circuit information and the second circuit information in association with each state to be transitioned by the controller, wherein the controller is configured to
read, from the second storage, the first base address information associated with a unit code, of the unit codes, that is being executed;
read the first offset information and the pointer associated with a current state from the sixth storage;
calculate a first address based on the read first base address information and the read first offset information; and
transmit the data stored in the fifth storage that is specified by the calculated first address and the read pointer, to the first operating unit,
wherein the first operating unit reads the first circuit information stored in the third storage and specified by the pointer, and performs the first operation process that is specified by the first circuit information for the data, and
wherein the second operating unit reads the second circuit information stored in the fourth storage and specified by the pointer received from the first operating unit, and performs the second operation process that is specified by the second circuit information on the result of the first operation process performed by the first operating unit.

3. The device according to claim 2, wherein the sixth storage stores a single pointer for each state to be transitioned by the controller, the single pointer being used for both of (1) reading the first circuit information stored in the third storage by the first operating unit and (2) reading the second circuit information stored in the fourth storage by the second operating unit.

4. The device according to claim 2, wherein the second storage stores second base address information in association with the unit codes and the first base address information,
wherein the sixth storage stores second offset information for generating an address specifying a region of the fifth storage into which the data is written, in association with the first offset information and the pointer, and
wherein the controller is further configured to
read, from the second storage, the second base address information associated with a unit code, of the unit codes, that is being executed;
read the second offset information associated with a current state from the sixth storage;
calculate a second address based on the read second base address information and the read second offset information; and
write a result of the second operation process of the second operating unit into a region of the fifth storage specified by the calculated second address.

5. The device according to claim 2, wherein the controller is transitioned into a different state when executing different unit codes, and
wherein, after the execution of the unit codes is completed, the controller writes new first offset information and a new pointer into a storage region of the sixth storage in which the first offset information and the pointer used by the executed unit codes are stored.

6. The device according to claim 2, wherein each unit code of the unit codes included in the program code includes information indicating a repetition group of one or more states in association with a repetition number of the repetition group.

7. A semiconductor device, comprising:
a first storage that stores a program code including unit codes defining a state transition;
a controller that sequentially reads the program code stored in the first storage to obtain the unit codes and transitions a state by executing each unit code of the read unit codes;
a plurality of operating units that perform an operation process that is specified by circuit information, for a plurality of cycles;
a second storage that stores first circuit information that specifies an operation process performed by a first one of the plurality of operating units; and
a third storage that stores a pointer specifying the first circuit information stored in the second storage and second circuit information that specifies an operation process performed by a second one of the plurality of operating units in association with each state to be transitioned by the controller,
wherein the controller is configured to, for each cycle of the plurality of cycles,
read the second circuit information and the pointer associated with a current state from the third storage;
transmit the second circuit information to the second one of the plurality of operating units; and
transmit the first circuit information stored in the second storage and specified by the pointer to the first one of the plurality of operating units.

8. A semiconductor device, comprising:
a first storage that stores a program code including unit codes defining a state transition;
a controller that sequentially reads the program code stored in the first storage to obtain the unit codes and transitions a state by executing each unit code of the read unit codes;
a first operating unit provided with a second storage that stores first circuit information and performs a first operation process that is specified by the first circuit information;
a second operating unit provided with a third storage that stores second circuit information and performs a second operation process that is specified by the second circuit information; and
a fourth storage that stores a pointer specifying the first circuit information stored in the second storage and the second circuit information stored in the third storage in association with each state to be transitioned by the controller,
wherein the controller reads the pointer associated with a current state from the fourth storage, and transmits the pointer to the first operating unit, for a plurality of cycles,
wherein the first operating unit is configure to, for each cycle of the plurality of cycles,
read the first circuit information stored in the second storage and specified by the pointer;
perform the first operation process that is specified by the first circuit information; and
transmit the pointer to the second operating unit, and
wherein the second operating unit reads the second circuit information stored in the third storage and specified by the pointer received from the first operating unit, and performs the second operation process that is specified by the second circuit information for each cycle.

9. A semiconductor device, comprising:
a first storage that stores a program code including unit codes defining a state transition;
a controller that sequentially reads the program code stored in the first storage to obtain the unit codes and transitions a state by executing each unit code of the read unit codes;
a first operating unit that performs a first operation process specified by first circuit information, for a plurality of cycles;

a second operating unit provided with a second storage that stores second circuit information and performs a second operation process that is specified by the second circuit information; and a third storage that stores the first circuit information and a pointer specifying the second circuit information stored in the second storage in association with each state to be transitioned by the controller, wherein the controller is configured to for each cycle of the plurality of cycles, read the first circuit information and the pointer associated with a current state from the third storage;

transmit the first circuit information to the first operating unit; and transmit the pointer to the second operating unit, wherein the first operating unit performs the first operation process specified by the first circuit information for each cycle of the plurality of cycles, and wherein the second operating unit reads the second circuit information stored in the second storage and specified by the pointer, and performs the second operation process that is specified by the second circuit information.

\* \* \* \* \*